(12) United States Patent
Morrison et al.

(10) Patent No.: US 8,531,725 B2
(45) Date of Patent: Sep. 10, 2013

(54) RASTERING DISJOINT REGIONS OF THE PAGE IN PARALLEL

(75) Inventors: Paul William Morrison, St Clair (AU); David Robert James Monaghan, Eastwood (AU); Edward James Iskenderian, Pendle Hill (AU)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 13/153,209

(22) Filed: Jun. 3, 2011

(65) Prior Publication Data

US 2011/0299105 A1    Dec. 8, 2011

(30) Foreign Application Priority Data

Jun. 8, 2010   (AU) .................... 2010202390

(51) Int. Cl.
*G06K 15/02*   (2006.01)
(52) U.S. Cl.
CPC .......... *G06K 15/181* (2013.01); *G06K 15/1848* (2013.01)
USPC ............... 358/1.9; 358/1.1; 715/276

(58) Field of Classification Search
USPC ........ 358/1.1, 1.9, 3.24, 1.15, 1.18; 715/273, 715/276
See application file for complete search history.

(56) References Cited

U.S. PATENT DOCUMENTS

| 7,365,743 | B1 | 4/2008 | Chen |
| 2007/0296725 | A1 | 12/2007 | Steiner et al. |
| 2008/0273218 | A1 | 11/2008 | Kitora |
| 2012/0093401 | A1* | 4/2012 | Tsunematsu ................. 382/165 |
| 2013/0027402 | A1* | 1/2013 | Iskenderian et al. .......... 345/440 |

* cited by examiner

*Primary Examiner* — Scott A Rogers
(74) *Attorney, Agent, or Firm* — Canon U.S.A., Inc. IP Division

(57) ABSTRACT

Disclosed is a method of rasterizing a page comprising a plurality of graphic objects. The method obtains a plurality of pixel-aligned object edges (302,303) of the graphic objects (203), and determining a pixel generation path (402) for the plurality of graphic objects. The method determines a plurality of crossing locations (420-424) based on the pixel aligned object edges and the pixel generation path, at least one of the crossing locations being a vertical crossing location and at least one other crossing location being a horizontal crossing location, rasterizes the page according to the pixel generation path by updating a fill sequence (620-623) upon encountering said determined crossing locations.

15 Claims, 21 Drawing Sheets

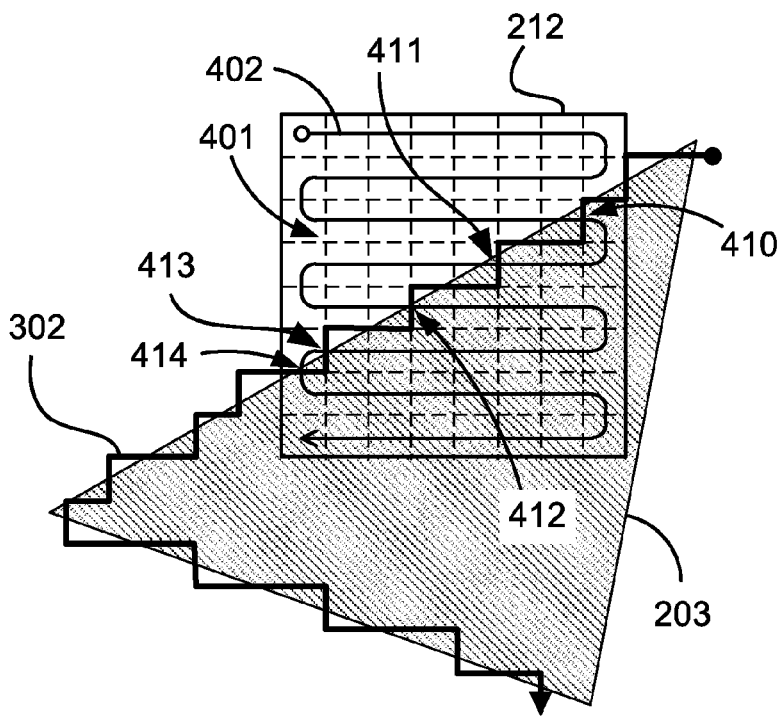
Fig. 4a
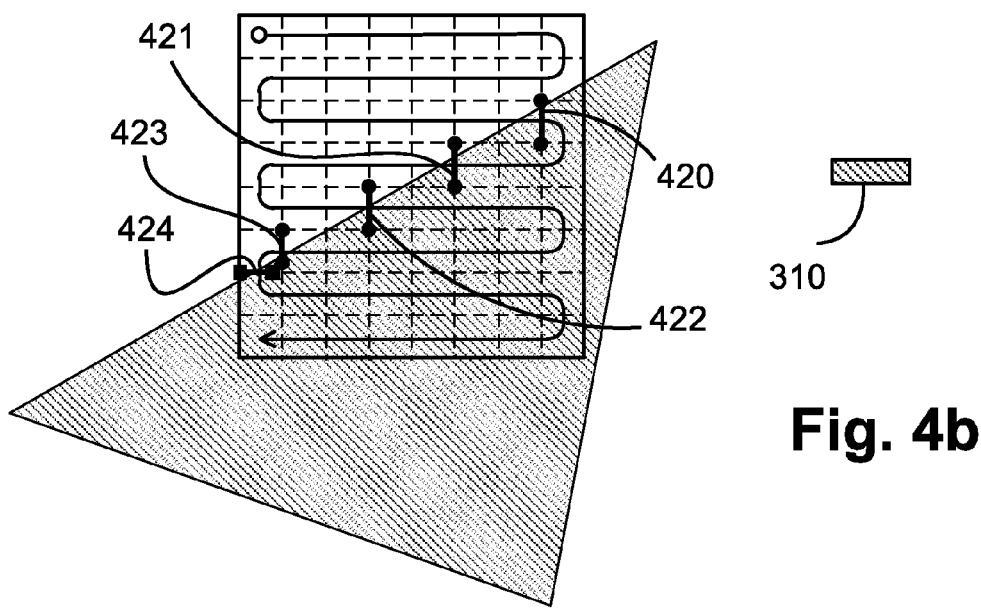
Fig. 4b
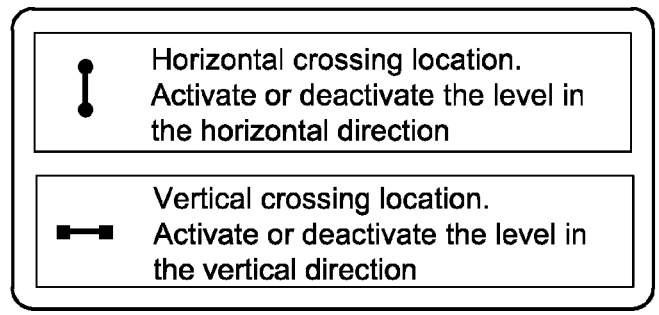
| Legend (Figs. 4a and 4b) | • | Horizontal crossing location. Activate or deactivate the level in the horizontal direction |
|---|---|---|
| | ⊢■⊣ | Vertical crossing location. Activate or deactivate the level in the vertical direction |

RASTERING DISJOINT REGIONS OF THE PAGE IN PARALLEL

REFERENCE TO RELATED PATENT APPLICATION(S)

This application claims the benefit under 35 U.S.C. §119 of the filing date of Australian Patent Application No. 2010202390, filed Jun. 8, 2010 hereby incorporated by reference in its entirety as if fully set forth herein.

TECHNICAL FIELD

The present invention relates generally to computer-based printer systems and, in particular, to multi-threaded printing systems for high-speed printing.

BACKGROUND

A computer application typically provides a printable page to a printing device for printing to a hard copy medium, such as a paper sheet. The printable page is typically provided in the form of a description of the page to be printed, specified using a Page Description Language (PDL), such as Adobe® PDF or Hewlett-Packard® PCL. The PDL provides descriptions of objects to be rendered onto the page in a rendering (or z) order, as opposed to a raster image (i.e. a bitmap of pixel values) of the page to be printed. The page is typically rendered for printing by an object-based graphics system, also known as a Raster Image Processor (RIP). A RIP may also be used to render the page to a display.

The printing device receives the description of the page to be rendered and generates an intermediate representation of the page. The printing device then renders the intermediate representation of the page to pixels which are printed to print media, such as paper. In general, an intermediate representation of a page consumes less memory than the raster image representation. Also, in some prior art printing devices, the intermediate representation of the page may be rendered to pixels in real-time, being the rate at which the output device, be it a printer or a display, can reproduce output pixels. Real-time rendering is particularly important for video displays, where animation frame rates must be met to ensure fluidity of motion. Real-time rendering in a printing environment is important to ensure compliance with page throughput rates of the printer.

The intermediate page representation is generated by a controlling program which is executed by a controlling processor within the printer device. A pixel rendering apparatus is used to render the intermediate page representation to pixels. The rendered pixels are transferred to a printer engine, such as an electro-photographic engine, which prints the pixel onto the print media.

Next generation printing systems are expected to operate at a much higher page rate than current printing systems. This is in addition to an increase in device resolution, graphics complexity, and the number of print features supported.

In computing, there is a trend towards achieving higher performance through the use of multi-processor and multi-core architectures. These architectures allow a number of threads to execute in parallel, each on a corresponding processor, thereby reducing the overall time it takes to complete a task. However, in order to take advantage of such parallelism, the task must be broken down into largely independent sub-tasks that can be executed in parallel. This is difficult to achieve for many tasks, including many of the operations performed by a RIP.

The RIP process consumes a large proportion of time within a printing system. It is therefore desirable that the RIP process be accelerated through the use of multi-threading on a multi-core or multi-processor device. One method of performing the RIP process in parallel is by sub-dividing the output pixel space into regions, and performing the RIP process for each region in its own thread.

One method of doing this is to assign each page object to be rasterized to each of the regions that the page object overlaps or is present in. The regions can then be rasterized in parallel, with a separate thread processing each region. Each thread can only process those objects that overlap the region that is being rendered. However, because many objects may overlap many regions, many objects must be scan-converted multiple times, once for each region that the object overlaps. It is desirable that this duplication of processing be removed.

Another method of sub-dividing the output pixel space into regions, which removes this duplication of object scan-conversion, is to split each page object prior to scan-conversion, according to the object's intersections with region boundaries. A number of sub-objects are produced, each of which is present in (or overlaps) only a single region. Each sub-object therefore only needs to be scan-converted once. However, the splitting of high-level graphic objects (which normally consist of primitives such as lines and Bezier splines) is complex, and can result in mathematical errors which affect the quality of the rasterized output.

It is desirable that one or more these problems with the prior art be resolved, or at least ameliorated, while still allowing the intermediate representation of each region of the page to be generated in parallel.

SUMMARY

In accordance with one aspect of the present disclosure there is provided a computer-implementable method of rasterizing a page comprising a plurality of graphic objects, said method comprising:

obtaining a plurality of pixel-aligned object edges of the graphic objects;

determining a pixel generation path for the plurality of graphic objects;

determining a plurality of crossing locations based on the pixel aligned object edges and the pixel generation path, at least one of the crossing locations being a vertical crossing location and at least one other crossing location being a horizontal crossing location; and rasterizing the page according to the pixel generation path by updating a fill sequence upon encountering said determined crossing locations.

According to another aspect of the present disclosure, there is provided a method of rasterizing a page comprising a plurality of graphic objects, said method comprising:

dividing the page into a plurality of regions, and for at least one of the plurality of regions:

obtaining a plurality of pixel-aligned object edges of the graphic objects;

determining a pixel generation path for the plurality of graphic objects;

determining a plurality of crossing locations based on the pixel aligned object edges and the pixel generation path, at least one of the crossing locations being a vertical crossing location and at least one other crossing location being a horizontal crossing location; and rasterizing the region according to the pixel generation path by updating a fill sequence upon encountering said determined crossing locations.

Other aspects are also disclosed.

BRIEF DESCRIPTION OF THE DRAWINGS

At least one embodiment of the present invention will now be described with reference to the following drawings, in which:

FIG. 1a shows a display list representation of a page;

FIG. 1b shows the pixel-aligned object edges, and their associated fills, of the page which is represented in FIG. 1a;

FIG. 1c shows a fillmap representation of the page which is represented in FIG. 1a;

FIG. 1d shows a tiled fillmap representation of the page which is represented in FIG. 1a;

FIGS. 4a and 4b show the generation of crossing locations for an object in a given region;

DETAILED DESCRIPTION INCLUDING BEST MODE

Figures 1A, 1B:
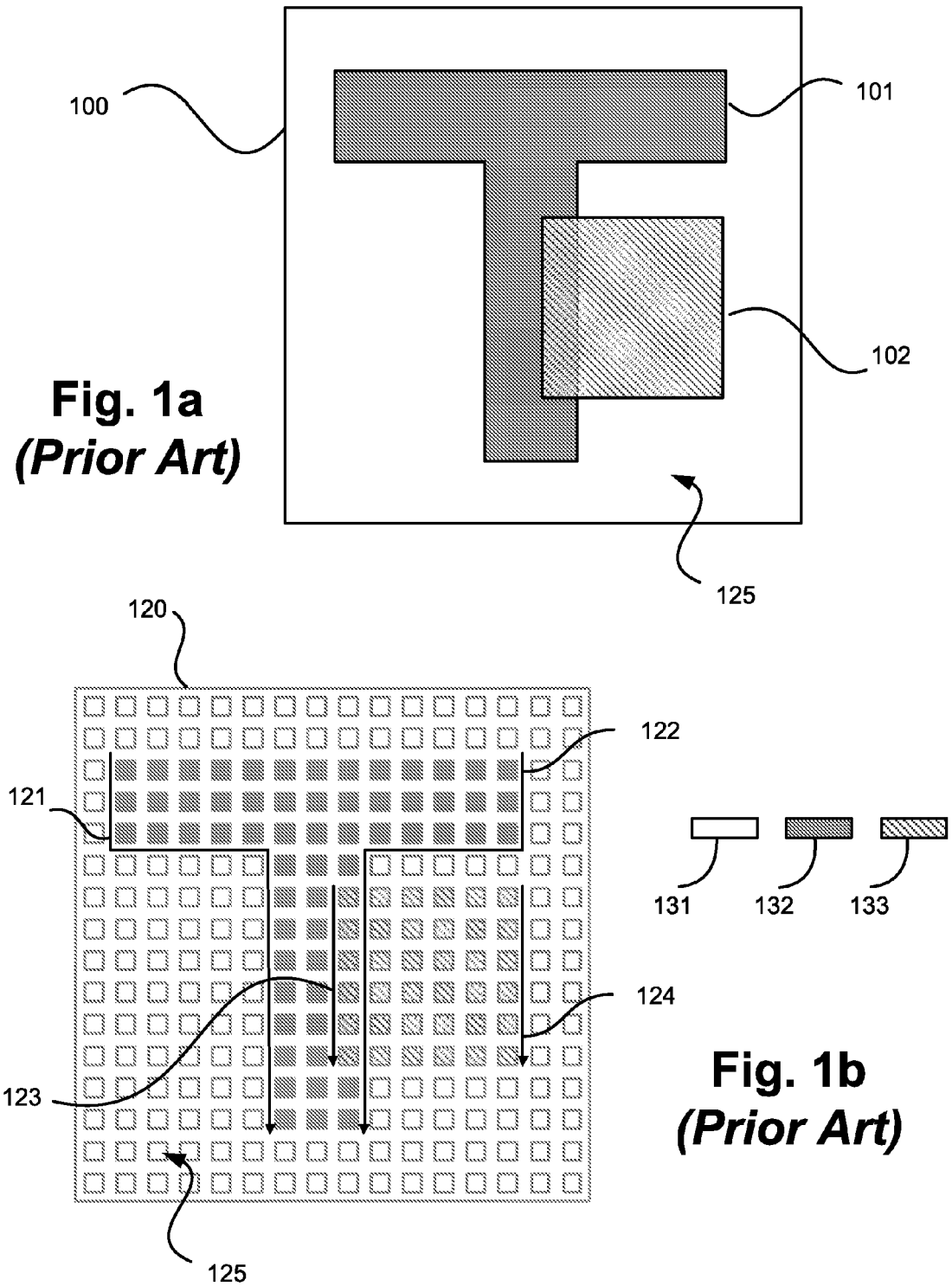

A RIP is typically required to convert a high-level description of a page to a raster representation. A high-level description of a page contains objects such as text, lines, fill regions, and image (bitmap) data. A raster representation of the page is made up of colour pixel data. A printer engine will then typically print the raster representation of the page onto print media such as paper. Before producing a raster representation, a RIP may produce an intermediate representation of the page. An intermediate representation of the page will typically be more compact than a raster representation, but can be quickly and easily converted to a raster representation. The fillmap representation is an example of an intermediate representation of a page.

A fillmap representation of a page will now be described in more detail. A fillmap is a region-based representation of a page. The fillmap maps a portion or fillmap region of pixels within the page to a fill sequence which will be composited to generate the colour data for each pixel within that fillmap region. Multiple fillmap regions within a fillmap can map to the same fill sequence. Fillmap regions within the fillmap do not overlap (i.e. they are non-overlapping fillmap regions) and hence each pixel in the rendered page can only belong to a single fillmap region. Each fillmap region within the fillmap is defined by a set of pixel-aligned fillmap edges which activate the fill sequence associated with that fillmap region. Pixel-aligned fillmap edges:

(i) are monotonically increasing in the y-direction of the page;

(ii) do not intersect;

(iii) are aligned with pixel boundaries, meaning that each pixel-aligned fillmap edge consists of a sequence of segments, each of which follows a boundary between two contiguous pixels;

(iv) contain a reference field referring to the index of the fill sequence, within the table of fill sequences, required to be composited to render the fillmap region, to which the pixel-aligned fillmap edge belongs, to pixels; and (v) activate pixels within a single fillmap region.

On any given scanline (i.e. y being constant), starting at a pixel-aligned fillmap edge which activates a fillmap region, and progressing in the direction of increasing x, the fillmap region remains active until a second pixel-aligned fillmap edge which activates a further fillmap region is encountered. When the second pixel-aligned fillmap edge is encountered, the active fillmap region is deactivated, and the fillmap region corresponding to the second pixel-aligned fillmap edge is activated.

Within a fillmap, the fill sequence active within each fillmap region of pixels is stored in the table of fill sequences. A fill sequence is a sequence of z-ordered levels, where each level contains attributes such as a fill, the opacity of the level, a compositing operator which determines how to mix the colour data of this level with other overlapping levels, and the priority, or z-order, of the level. A fill sequence contains references to all the levels which may contribute colour to the pixels within a fillmap region. The table of fill sequences contains all of the fill sequences required to render the portions of the page to pixels. The table of fill sequences does not contain duplicate instances of identical fill sequences. Hence, multiple fillmap regions within a fillmap which map to the same fill sequence, map to the same instance of the fill sequence within the table of fill sequences.

The generation of a fillmap representation of a page will now be described with reference to FIGS. 1a to 1d. FIG. 1a shows a page representation 100. The page has a white background. The page contains two page objects. The first page object 101 is an opaque "T" shaped object with a grey flat fill. The second page object 102 is a semi-transparent square with a hatched fill. Examples of other fills include blends representing a linearly varying colour, bitmap images and tiled (i.e. repeated) images. As can be seen, the second page object 102 overlaps the first page object 101, and by virtue of the semi-transparency of the page object 102, the page object 101 can be seen through the overlapping portion. The page representation 100 also includes a background 125 over which all page objects are to be rendered.

FIG. 1b shows a decomposition of the page objects into pixel-aligned object edges, levels, and fills, according to a pixel grid 120. A page object is decomposed into two or more pixel-aligned object edges, a single level, and one or more fills. Pixel-aligned object edges define the activation or deactivation of a level during rasterization. Rasterization is the name given to a process that determines the colours of the pixels of an image or page, during image or page generation using graphic object based data. Pixel-aligned object edges therefore refer to the level of the object from which they are derived. As illustrated, the first page object 101 is decomposed into two pixel-aligned object edges 121 and 122, and a level 132 that consists of a grey flat fill. Pixel-aligned object edges 121 and 122 refer to the level 132 of the first page object 101. The second page object 102 is decomposed into two pixel-aligned object edges 123 and 124, and a level 133 that comprises a transparent hatched fill. Pixel-aligned object edges 123 and 124 refer to the level 133 of the second page object 102. The background 125 has a level 131 that consists of white fill.

Figure 1C:
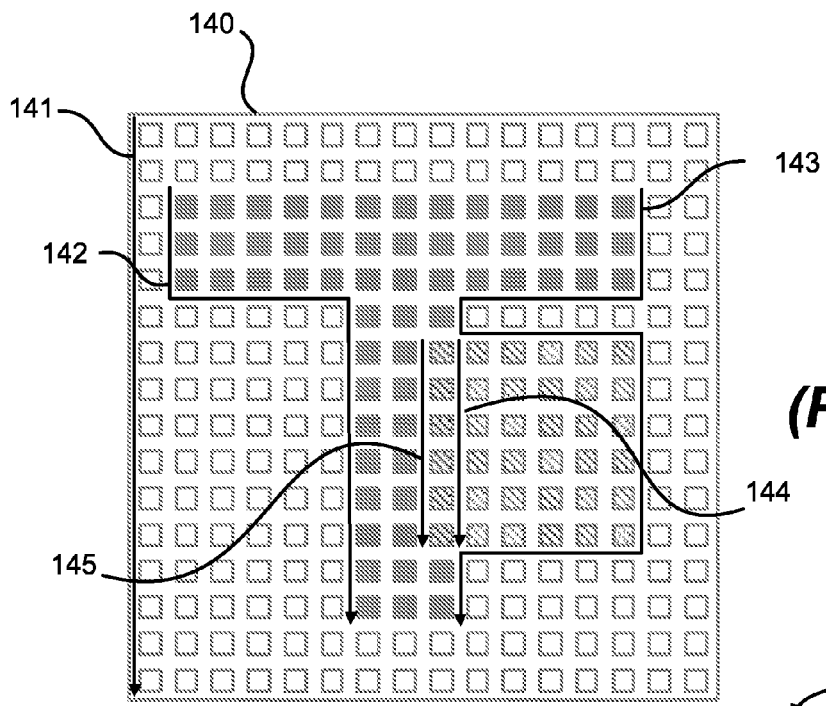

FIG. 1c shows a fillmap representation 140 of the page represented in FIG. 1a. The fillmap representation is composed of five pixel-aligned fillmap edges. Each pixel-aligned fillmap edge references a fill sequence which will be used to determine the colour of each of the pixels activated by that pixel-aligned fillmap edge. On any given scan line on which a pixel-aligned fillmap edge is active, the pixel-aligned fillmap edge will activate those pixels which are immediately to the right of the pixel-aligned fillmap edge, until the next pixel-aligned fillmap edge or a page boundary is encountered. The first pixel-aligned fillmap edge 141 traces the left hand boundary of the page, and references a fill sequence 151 which contains a single opaque level which is to be filled using the fill for the background 125. The second pixel-aligned fillmap edge 142 traces the left hand boundary of the first object 101, and references a fill sequence 152 that contains a single level which is opaque and is to be filled using a grey flat fill. The third pixel-aligned fillmap edge 143 references the same fill sequence 151 as the first pixel-aligned fillmap edge 141. The fourth pixel-aligned fillmap edge 144 traces the left hand boundary of the region where the second object 102 overlaps the white background. The fourth pixel-aligned fillmap edge 144 references a fill sequence 154 which contains two levels. The top most level is transparent and is to be filled using a hatched fill. The bottom most level is opaque and is to be filled using the background fill. The fifth pixel-aligned fillmap edge 145 traces the left hand boundary of the region where the second object 102 overlaps the first object 101. The fifth pixel-aligned fillmap edge 145 references a fill sequence 153 which contains two levels. The top most level is transparent and is to be filled using a hatched fill. The bottom most level is opaque and is to be filled using a grey flat fill.

Accompanying the fillmap representation 140 of the page is a table 150 of fill sequences which contains the fill sequences 151, 152, 153 and 154 referenced by the pixel-aligned fillmap edges contained in the fillmap representation 140 of the page.

Figure 1D:
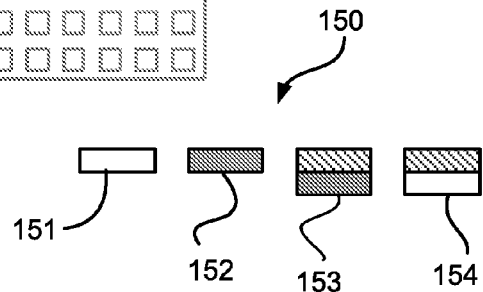
Figure 1D:
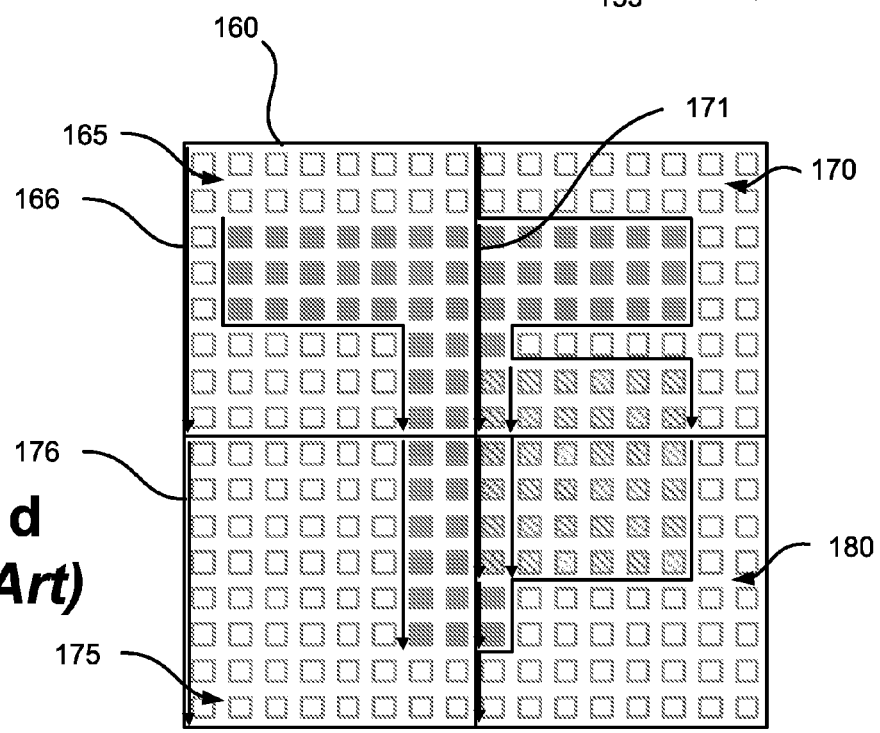

FIG. 1d shows a tiled fillmap representation 160 of the page represented in FIG. 1a. The tiled fillmap contains four tiles 165, 170, 175 and 180. Each tile has a height and width of eight pixels. In order to generate the tiled fillmap representation 160 of the page, the pixel-aligned fillmap edges of the original fillmap representation 140 have been split across tile boundaries. For example, the pixel-aligned fillmap edge 141 which traces the left hand boundary of the page in the untiled fillmap representation 140 shown in FIG. 1c has been divided into two pixel-aligned fillmap edges 166 and 176. The first pixel-aligned fillmap edge 166 activates pixels in the top-left hand tile 165, while the second pixel-aligned fillmap edge 176 activates pixels in the bottom-left hand tile 175. Also, new pixel-aligned fillmap edges have been inserted on the tile boundaries to activate the left most pixels of each tile which were previously activated by a pixel-aligned fillmap edge in a tile to the left of the tile in which the pixels reside. For example, in the top-right hand tile 170 a new pixel-aligned fillmap edge 171 has been inserted to activate pixels which were activated by the pixel-aligned fillmap edge 142 which traces the left hand boundary of the first object 101 in the original fillmap representation 140 shown in FIG. 1c.

For pages containing many complex page objects, the generation of a fillmap representation can require a lot of processing. It is desirable that, in a multi-threaded system, the RIP take advantage of parallel processing techniques to improve the speed of fillmap representation generation. This will result in the effective acceleration of the printing system. The present disclosure provides a method of rasterizing disjoint regions of a page in parallel, in order to improve the speed of fillmap representation generation, which will now be described. The method is generally computer-implementable and is preferably implemented using computerized apparatus, for example in hardware in a computer system, in software in a computer system, using a combination of software and hardware in the computer system, or in embedded computerised component within a printer system, using software and/or hardware.

Figure 2:
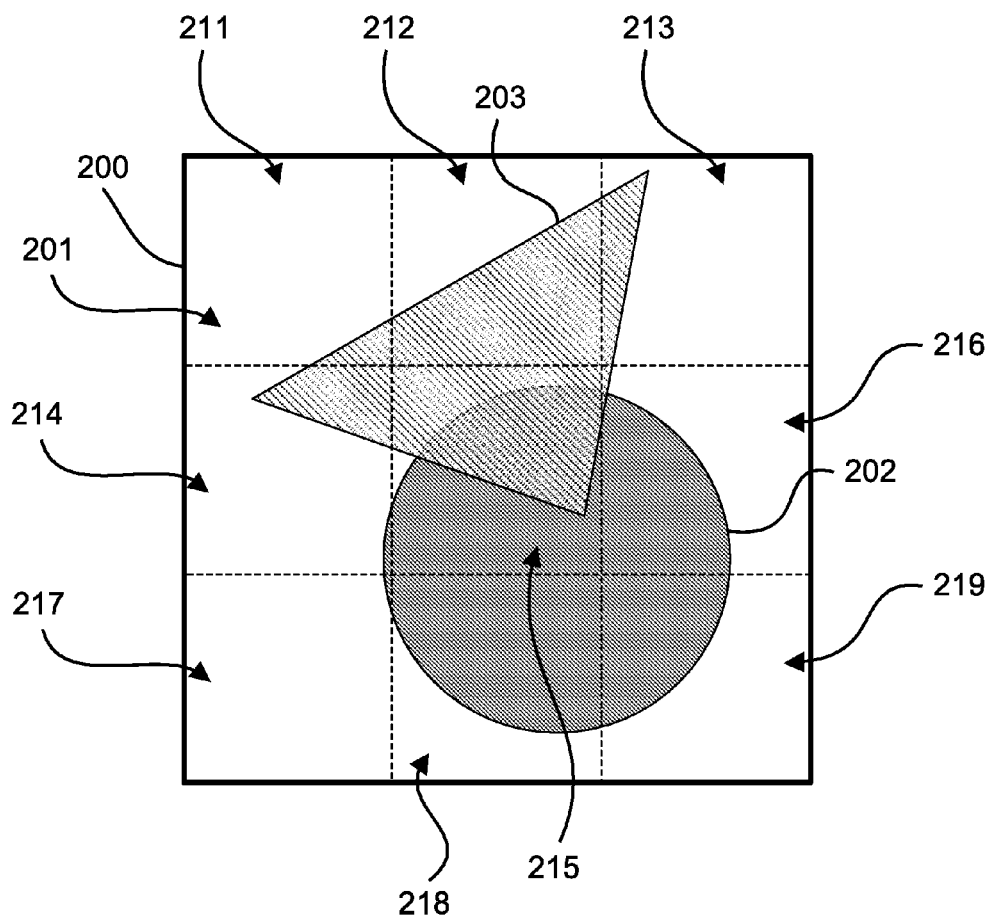
FIG. 2 shows a page representation containing page objects and a division of the page representation into nine disjoint regions.

FIG. 2 shows a page representation 200 containing page objects. These page objects include a white background 201, a circle 202 with a grey flat fill, and a triangle 203 with a hatched fill. The triangle 203 with the hatched fill is semi-transparent and has a higher priority than the circle 202 with the grey flat fill. In addition, the triangle 203 with the hatched fill partially overlaps the circle 202 with the grey flat fill.

FIG. 2 also shows a division of the page representation 200 into nine disjoint regions 211-219. In an exemplary implementation, the page representation 200 is divided into square regions of equal size. Alternatively, regions may be of any shape, and the page representation may be divided into regions of different shapes and sizes, provided the page representation is completed accommodated by the regions. Preferably, the region size is an integer multiple of the fillmap tile size.

Figure 3:
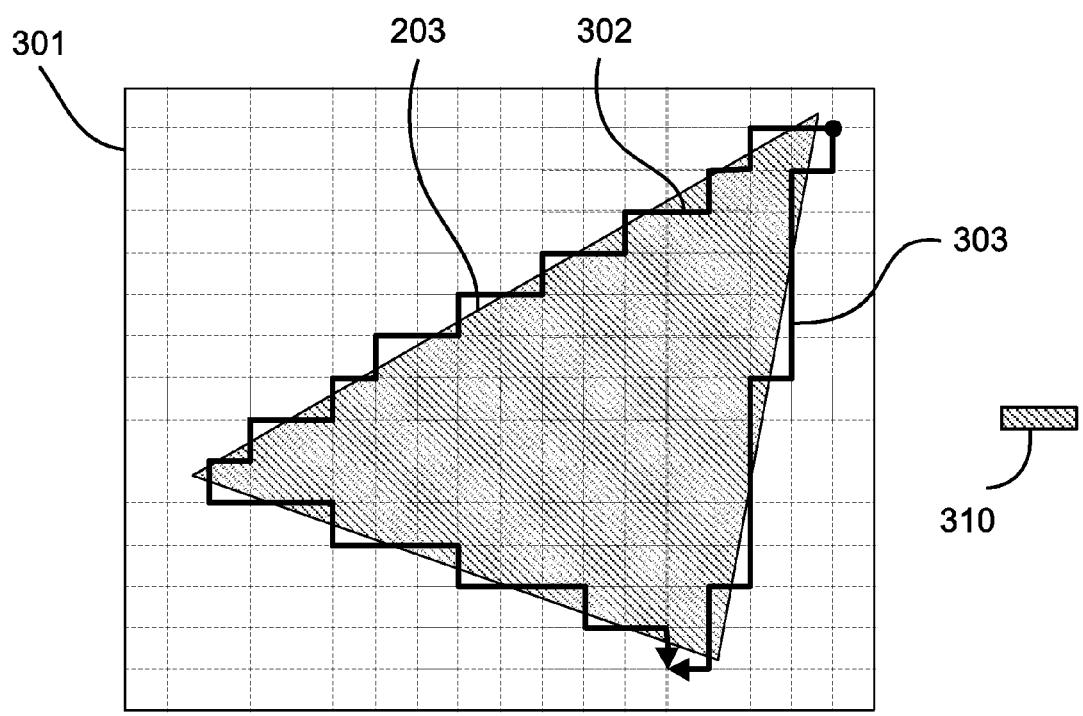
FIG. 3 shows the generation of pixel-aligned object edges of an object according to a pixel grid.

FIG. 3 shows the scan-conversion of the page object 203 according to a pixel grid 301. During the scan-conversion of the page object 203, pixel-aligned object edges 302 and 303 are generated. Pixel-aligned object edge 302 traces the left hand boundary of the page object 203, and references a level 310 with a hatched fill. Pixel-aligned object edge 303 traces the right hand boundary of the page object 203, and also references a level 310 with a hatched fill. Pixel-aligned object edge 302 defines the activation of the level 310 associated with this page object 203 during scan line processing from left to right. Pixel-aligned object edge 303 defines the de-activation of this level 310 during scan line processing from left to right.

FIG. 4a shows the pixel grid 401 of the region 212 overlaid on the page object 203 and one of the pixel-aligned object edges 302 of the page object 203. Also shown in FIG. 4a is a pixel generation path 402 used to generate the fillmap for region 212. A pixel generation path is a path through all pixels in a region. The pixel generation path is used at a later stage to determine the pixel-aligned fillmap edges and fill sequences for each region of the page. Different pixel generation paths, and the selection of the optimal pixel generation path for a region, will be described later with reference to FIG. 9, FIG. 10, and FIG. 11.

FIG. 4b shows the determination of the plurality of crossing locations of pixel-aligned object edges of the page object 203 with the pixel generation path 402, within the region 212. A crossing location is situated on the border between two pixels in a region, and indicates a level activation or deactivation when a pixel generation path crosses the crossing location. Crossing locations are determined by calculating the intersections of a pixel-aligned object edge with a pixel generation path for a given region. For example, the pixel-aligned object edge 302 crosses the pixel generation path 402 in the region 212 on five occasions, thus forming crossings 410-414, shown in FIG. 4a. These crossings 410-414 are used to determine the crossing locations 420-424, respectively, seen in FIG. 4b. The number of crossings and the number of crossing locations in a region need not be identical. In general, there are two kinds of crossing locations: horizontal crossing locations and vertical crossing locations. Horizontal crossing locations indicate a level activation or deactivation when the pixel generation path is travelling in a horizontal direction, either from left-to-right or from right-to-left. Vertical crossing locations indicate a level activation or deactivation when the pixel generation path is travelling in a vertical direction, either from top-to-bottom or bottom-to-top. For example, as seen in FIG. 4b, four horizontal crossing locations 420-423 are determined for the edge 302 in region 212 using pixel generation path 402. Horizontal crossing locations 420 and 422 are crossed by the pixel generation path 402 in the direction from left to right. Horizontal crossing locations 421 and 423 are crossed by the pixel generation path 402 in the direction from right to left. One vertical crossing location 424 is determined for edge 302 in region 212 using pixel generation path 402. This vertical crossing location 424 is crossed by the pixel generation path 402 in the direction from top to bottom. In the example in FIG. 4b, the there are no vertical crossing locations that are crossed by the pixel generation path 402 in the direction from bottom to top.

A crossing location may indicate either a level activation or a level deactivation, depending on whether the pixel generation path is entering or exiting a page object when it crosses a crossing location. For example, in FIG. 4b, the pixel generation path 402 is entering the page object 203 at crossing locations 420, 422, and 424. Therefore, crossing locations 420, 422, and 424 indicate level activation. The pixel generation path 402 is exiting the page object 203 at crossing locations 421 and 423. Therefore, crossing locations 421 and 423 indicate level deactivation. All crossing locations are assigned the level that corresponds the pixel-aligned object edge from which the crossing location was derived. For example, each of the crossing locations 420-424 are assigned the level 310 with the hatched fill of the pixel-aligned object edge 302. During the rasterization of region 212, this level 310 will be activated and deactivated as the pixel generation path 402 encounters crossing locations 420-424. The rasterization of a region of the page will be described later with reference to FIG. 7.

Note that crossing locations determine the activation and deactivation of associated levels as crossing locations are encountered along a pre-determined pixel generation path. The determined crossing locations and whether they activate or deactivate their associated level therefore depends heavily on the pixel generation path used. The effects of using different pixel generation paths for a given region will be described later with reference to FIG. 10 and FIG. 11.

Figure 5:
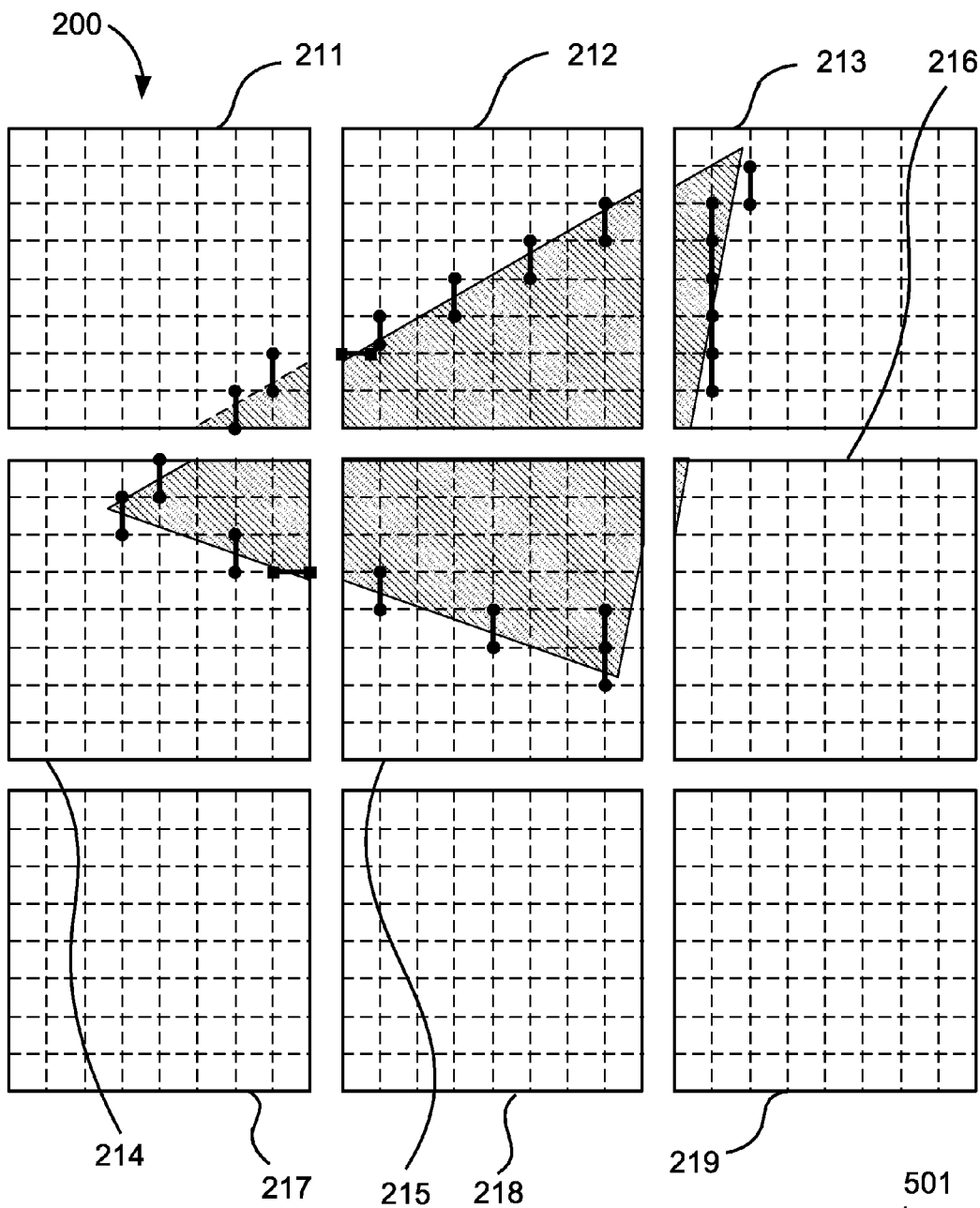
FIG. 5 shows the crossing locations generated for an object in a number of regions of a page.
Figure 5:
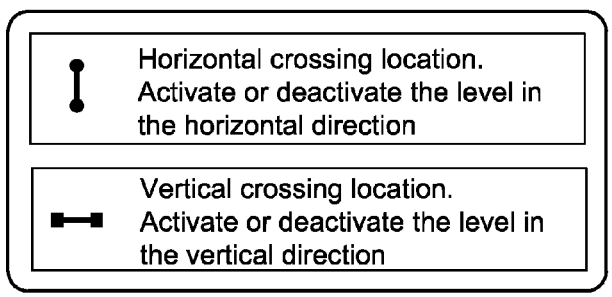

FIG. 5 shows the plurality of crossing locations for page object 203 based on pixel-aligned object edges 302 and 303 and a pixel generation path 501. Crossing locations have been determined by calculating the intersections of each pixel-aligned object edge 302 and 303 with the pixel generation path 501 in each region that the pixel-aligned object edges 302 and 303 of the page object 203 intersect. The regions that the pixel-aligned object edges 302 and 303 of the page object 203 intersect are the regions 211-215. The pixel-aligned object edges 302 and 303 of page object 203 do not intersect regions 216-219, and therefore there are no crossing locations in these regions 216-219 for this page object 203. All determined crossing locations are assigned to the regions in which they appear.

Figure 6:
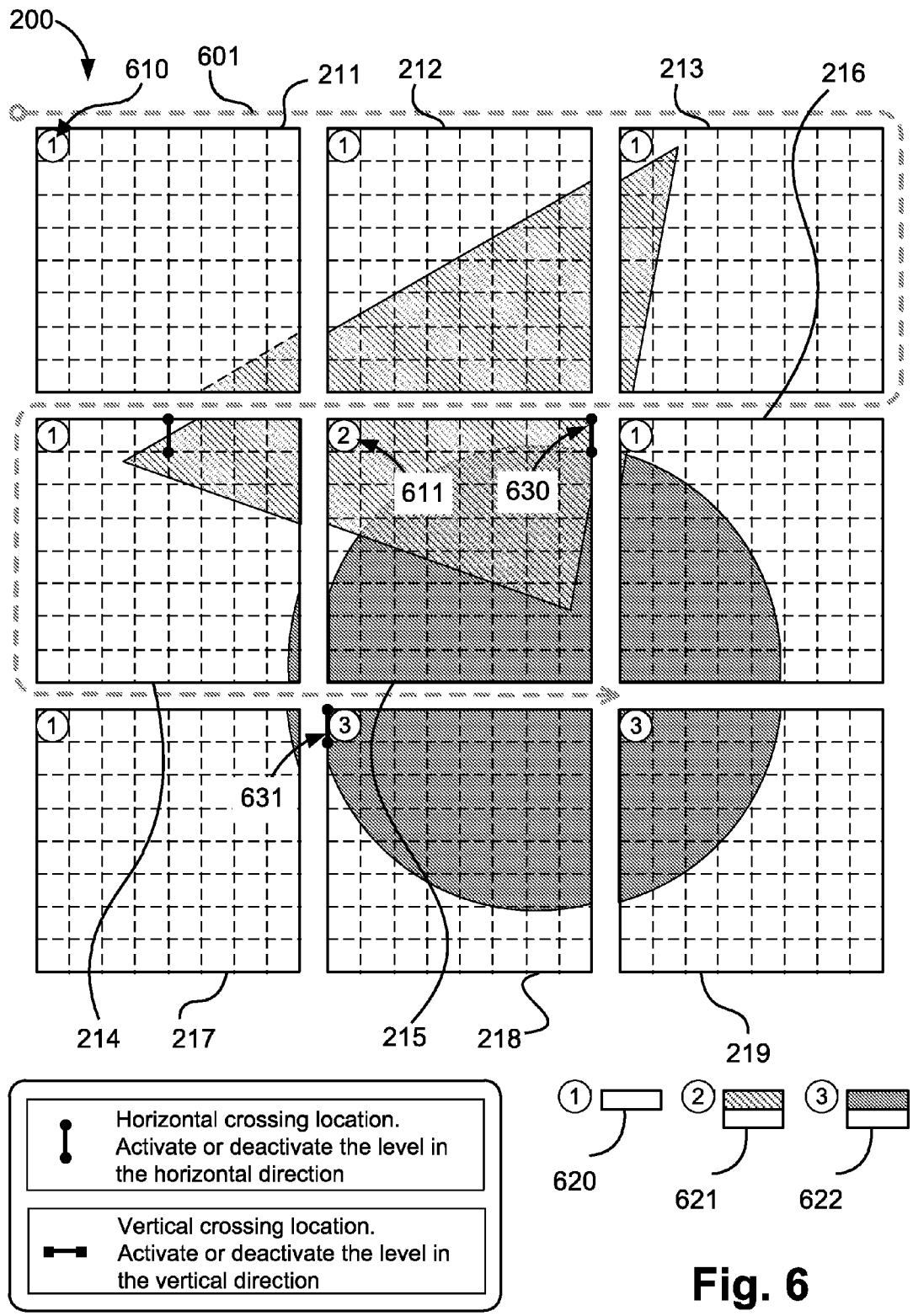
FIG. 6 shows the determination of an initial fill sequence for each of the regions of a page.

FIG. 6 shows the determination of the initial fill sequence for each of the regions 211-219 of the page 200. The initial fill sequence of a region is the fill sequence at the beginning of the pixel generation path for that region, being a predetermined location. In a preferred implementation, the pixel generation path for each region begins at the top-left corner of the region, which is the preferred predetermined location. In general, the pixel generation path may start at any pixel in a region. Using the pixel generation path 501, the initial fill sequence therefore defines the appearance of the top-left pixel in the region.

In the exemplary implementation, the initial fill sequence for each region is determined by traversing a region path through the region boundaries, such as the region path 601 shown in FIG. 6. The region path 601 begins at the top-left corner of the page 200. At the top-left corner of the page 200, the fill sequence consists only of the background fill 620. The initial fill sequence 610 of the top-left region 211 therefore consists of the background fill 620. In other pages, if there are page objects that lie on the page boundary, the fill sequence at the start of the region path may consist of fills other than, or in addition to, the background fill. For these pages, the pixel-aligned object edges of those page objects that lie on the page boundary will need to be processed, in order to determine the initial fill sequence at the start of the region path.

As the region path 601 is traversed, the current region path fill sequence is updated according to crossing locations that are adjacent to region boundaries. The current region path fill sequence is the fill sequence at the current location on the region path. Only those crossing locations that are touched by the region path need to be processed while traversing the region path. These crossing locations will depend on the region path chosen. For example, for the region path 601 shown in FIG. 6, the crossing locations that are processed are those adjacent to the top border of each region, those adjacent to the left border if the region is a left-most region of the page, and those adjacent to the right border if the region is a right-most region of the page.

When the region path 601 encounters vertical crossing location 630, which activates the level with a hatched fill 310, the current region path fill sequence is updated to include both the background fill and the hatched fill 621. When the region path 601 encounters the pixel at the beginning of the pixel generation path for a region, which is the top-left corner of each region in this example, the current region path fill sequence is assigned to the initial fill sequence of the region. For example, when the region path 601 encounters the top-left corner of region 215, the region's initial fill sequence 611 is set to be the fill compositing sequence with the background fill and the hatched fill 621.

Note that in the determination of the initial fill sequence for each region of the page, crossing locations in addition to those crossing locations determined previously for each page object may need to be determined. For example, crossing location 630 was not determined previously because it is situated on the border of two regions 215 and 216 and therefore does not intersect any pixel generation path of any of the regions 211-219. Crossing location 630 is required because it intersects region path 601 used to generate the initial fill sequence for each region. Crossing location 631 is another example of a crossing location that does not intersect any pixel generation path, but is required for the generation of the initial fill sequences. Crossing location 631 is used to determine the initial fill sequence 622 of regions 218 and 219. In the preferred implementation, crossing locations 630 and 631 will be determined, and then discarded once the initial fill sequence for each region has been generated.

Figure 7:
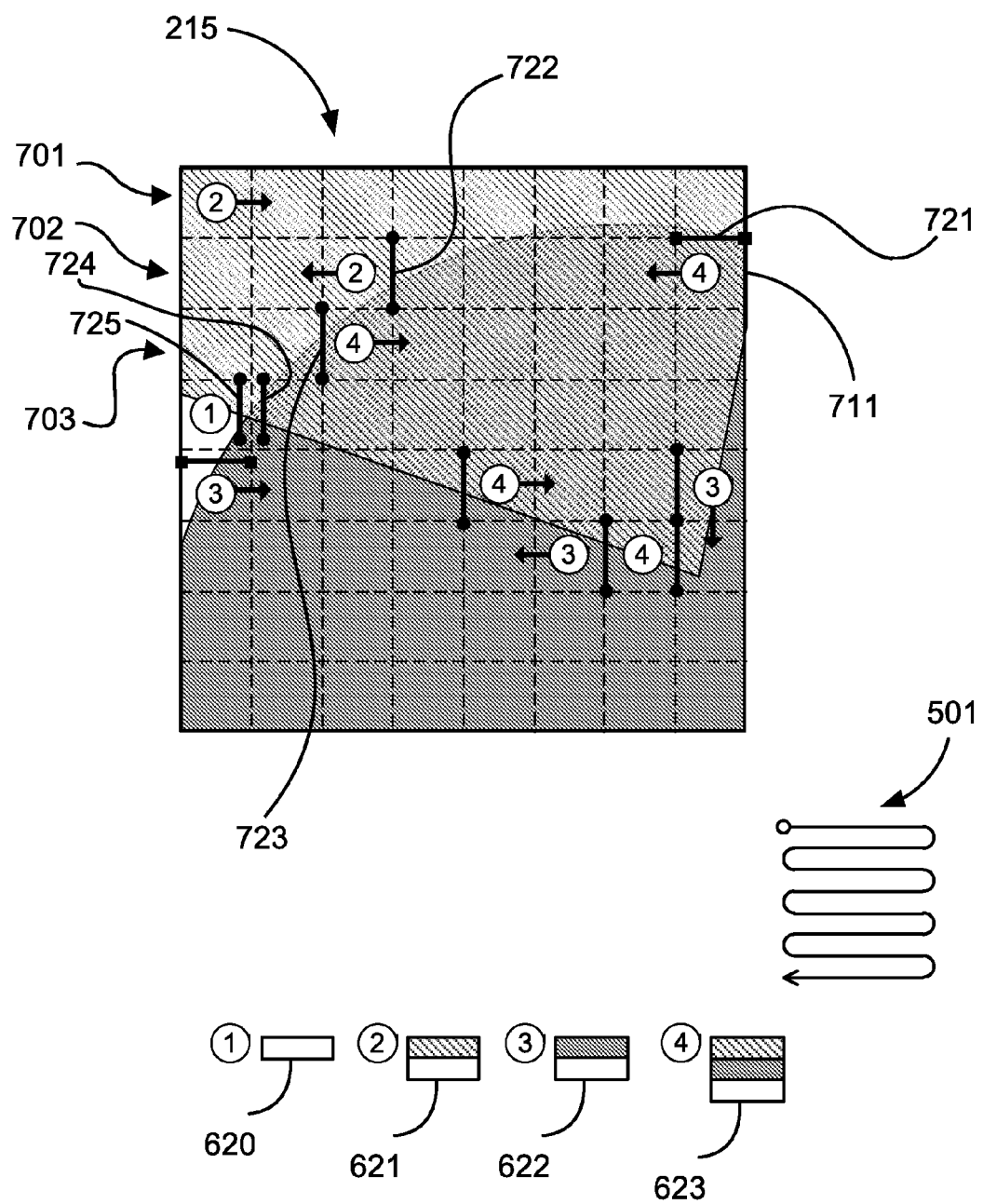
FIG. 7 shows the rasterization of an isolated region of the page, using a given raster path.

FIG. 7 shows the rasterization of an isolated region 215 of the page 200, using pixel generation path 501. Rasterization begins at the first scan line 701 using the initial fill sequence 621 for the region 215, which includes both the level with the background fill and the level with the hatched fill. As there are no crossing locations on the first scan line 701, the initial fill sequence 621 is used to determine the fill for all pixels in the first scan line 701. The pixel generation path 501 then proceeds to the right-most pixel 711 on the next scan line 702. As the pixel generation path 501 moves to pixel 711, it encounters vertical crossing location 721, which activates the level with the grey solid fill. The current fill sequence is therefore updated, by adding this level to the current fill sequence at a location corresponding to the z-value of the level, to become fill sequence 623, which contains the level with the background fill, the level with the grey solid fill, and the level with the hatched fill. The current fill sequence is the fill sequence corresponding to the current position on the pixel generation path. Fill sequence 623 is used to determine the fill for subsequent pixels that pixel generation path 501 touches, until pixel generation path 501 encounters horizontal crossing location 722. Horizontal crossing location 722 deactivates the level with a grey solid fill. The current fill sequence is therefore updated by removing the level to become fill sequence 621, which contains the level with the background fill and the level with the hatched fill. Pixel generation path 501 uses fill sequence 621 to determine the fill for the remaining pixels on scan line 702, and the left-most two pixels on scan line 703. Pixel generation path 501 then encounters on scan line 703 horizontal crossing location 723, which activates the level with the grey solid fill to produce fill sequence 623. Pixel generation path 501 continues until it encounters two horizontal crossing locations 724 and 725 at the same time in scan line 704. The crossing locations 724 and 725 are illustrated in FIG. 7 slightly displaced from the mutually adjacent pixel border for clarity purposes only, but in fact exist coincident on the pixel border. These two crossing locations 724 and 725 deactivate both the level with the hatched fill and the level with the grey solid fill. These deactivations result in the fill sequence that contains only the level with the background fill 620. Pixel generation path 501 continues to traverse the remainder of the region 215 in a similar way, as shown in FIG. 7. All regions of the page 200 are processed in a similar way.

Figure 8:
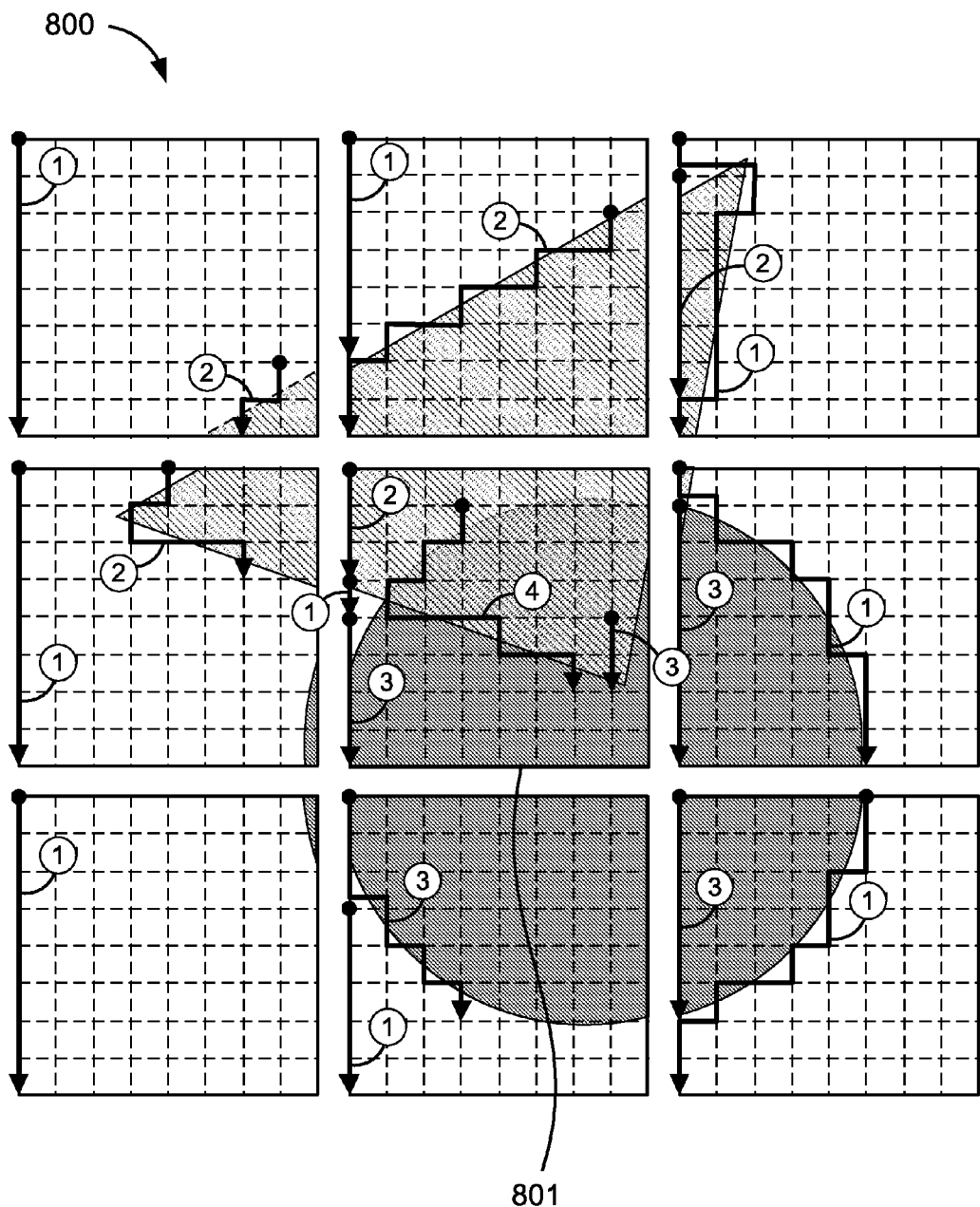
FIG. 8 shows a fillmap representation of the page generated according to the present disclosure.
Figure 8:
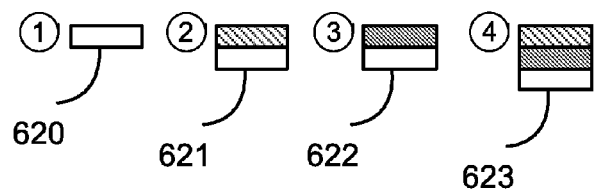

The output of the region rasterization process is a fillmap representation of the region. The fillmap representation 801 of the region 215 is shown in FIG. 8. FIG. 8 also shows the fillmap representation 800 for the all regions on the page 200. The fillmap representation was described previously with reference to FIG. 1.

Figure 9A:
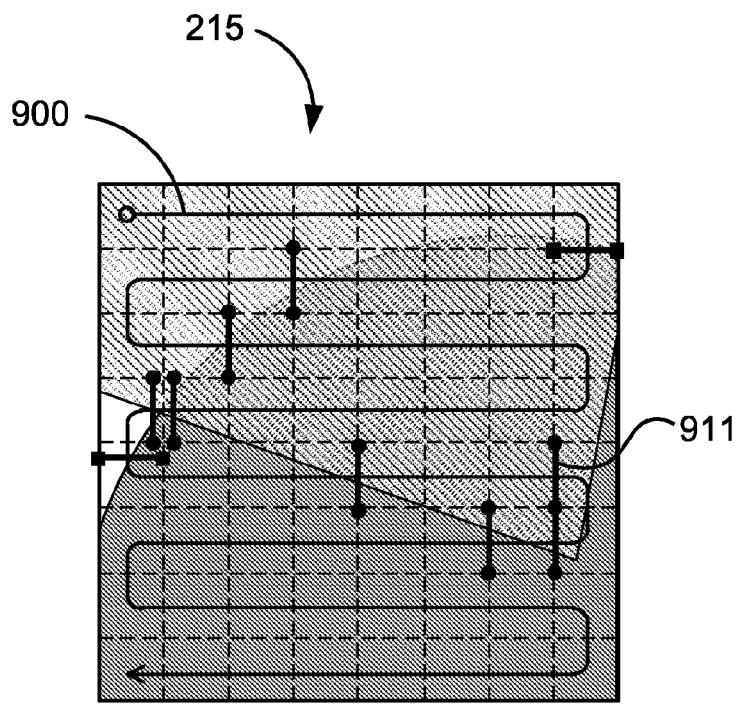
FIGS. 9a and 9b show the crossing locations required for a region using when using different pixel generation paths.
Figure 9B:
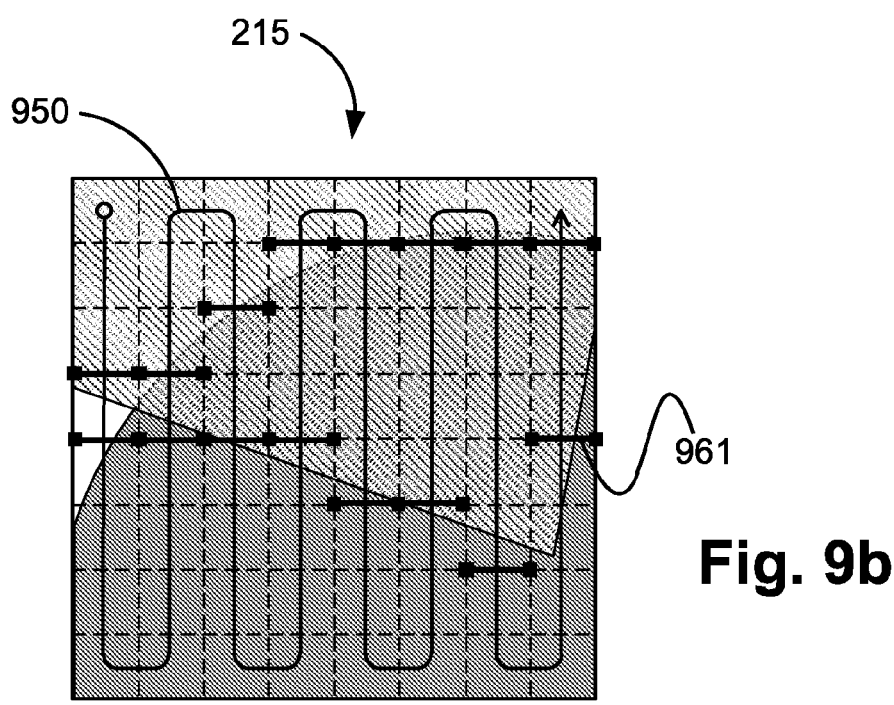

In one particular implementation, used in the previous example, the pixel generation path always traverses the pixels of a region using the same pixel generation path. This is additionally represented by the pixel generation path 900, shown in FIG. 9a. In other implementations, the pixel generation path can follow different paths through the pixels in a region. As mentioned previously, the crossing locations must be situated such that the correct level activations and deactivations are made along the chosen pixel generation path. FIGS. 9a and 9b show the rasterization of the region 215 using two different pixel generation paths, 900 and 950, respectively. Desirably, the pixel generation paths are continuous, as are each of the pixel generation paths 900 and 950, in that they only move between adjacent pixels. In other arrangements, pixel generation paths may not be continuous, and may move between pixels that are not adjacent. Continuous pixel generation paths have the advantage that the fill sequence does not need to be saved, and copied when a new scan line is started, for example.

Observe that the crossing locations required differ between the two pixel generation paths 900 and 950 for region 215. Only the crossing locations encountered by a pixel generation path are required. For example, vertical crossing location 961 in FIG. 9b is not crossed by pixel generation path 900 in FIG. 9a. Therefore, crossing location 961 is not needed when rasterizing region 215 using pixel generation path 900. Similarly, horizontal crossing location 911 in FIG. 9a is not crossed by pixel generation path 950 in FIG. 9b. Therefore, crossing location 911 is not needed when rasterizing region 215 using pixel generation path 950. The rasterization of region 215 using pixel generation path 900 was described previously with reference to FIG. 7. Rasterization using a different pixel generation path, such as pixel generation path 950, follows a similar process.

In the exemplary embodiment, the result of rasterizing the same region using different pixel generation paths is identical fillmap representations, thus permitting generic rendering of any fillmap so generated. This requirement means that subsequent processing of the fillmap representation can be independent of the pixel generation path used. For region 215, the result of rasterization using either pixel generation path 900 or 950 will result in the fillmap representation of the region 801, shown in FIG. 8.

When rasterizing a region, at each crossing location, processing is done to activate or deactivate levels, and to possibly change the current fill sequence. It is desirable that this processing be minimised. One method of minimising this processing is to select a pixel generation path that results in the least number of crossing locations. For example, when using the pixel generation path 900 to rasterize the region 215, shown in FIG. 9a, ten edge crossings are required, while sixteen edge crossings are required when using pixel generation path 950 of FIG. 9b. Using pixel generation path 950 to rasterize region 215 will therefore result in additional processing. In addition, using a pixel generation path that requires fewer crossing locations will result in less memory being required for storing crossing locations.

The number of crossing locations that will be generated in a region for a given pixel generation path can be approximated using the pixel-aligned object edges used to generate the crossing locations. In one approach to such approximation, pixel-aligned object edges are encoded as a start location, followed by a sequence of x-offsets on successive scan lines in the direction from the top of the region to the bottom of the region (known commonly as delta or offset encoding). To approximate the number of horizontal crossing locations for a pixel-aligned object edge, which are most likely to be crossed by a pixel generation path that primarily moves between pixels in the horizontal direction, such as the pixel generation path 900 shown in FIG. 9a, it is possible to sum the number of x-offsets encoded for the pixel-aligned object edge in the region. This indicates the number of scan lines that the edge touches in the region. To approximate the number of vertical crossing locations for a pixel-aligned object edge, which are most likely to be crossed by a pixel generation path that primarily moves between pixels in the vertical direction, such as the pixel generation path 950 shown in FIG. 9b, it is possible to sum the absolute values of the x-offsets for the pixel-aligned object edge in the region. An estimate of the overall number of horizontal and vertical crossing locations in a region can be obtained by summing the horizontal and vertical crossing locations, respectively, for each pixel-aligned edge in the region. The number of crossing locations required for a pixel generation path that primarily moves between pixels in the horizontal direction, such as the pixel generation page 900 shown in FIG. 9a, can be approximated as the total number of horizontal crossing locations for the region. The number of crossing locations required for a pixel generation path that primarily moves between pixels in the vertical direction, such as the pixel generation path 950 shown in FIG. 9b, can be approximated as the total number of vertical crossing locations for the region.

Figure 10:
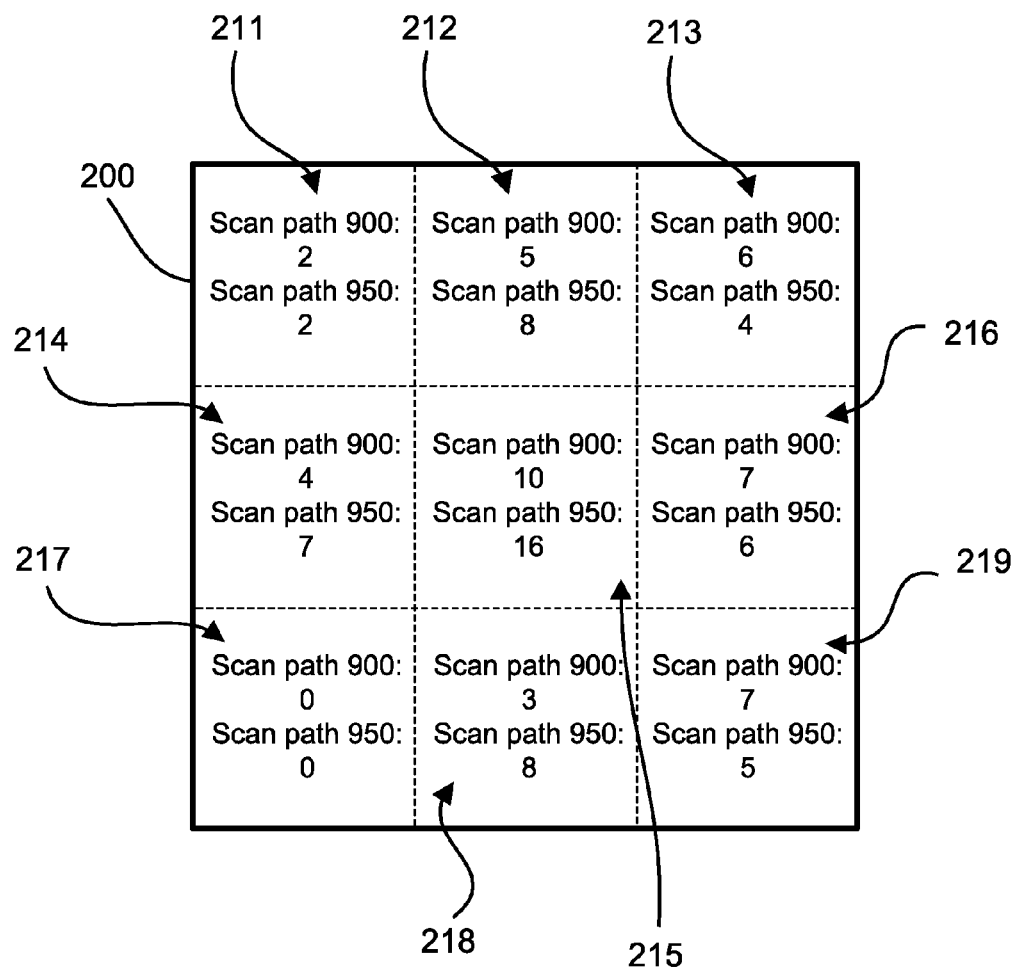
FIG. 10 shows the number of crossing locations in each region of a page when using different pixel generation paths.
Figure 11:
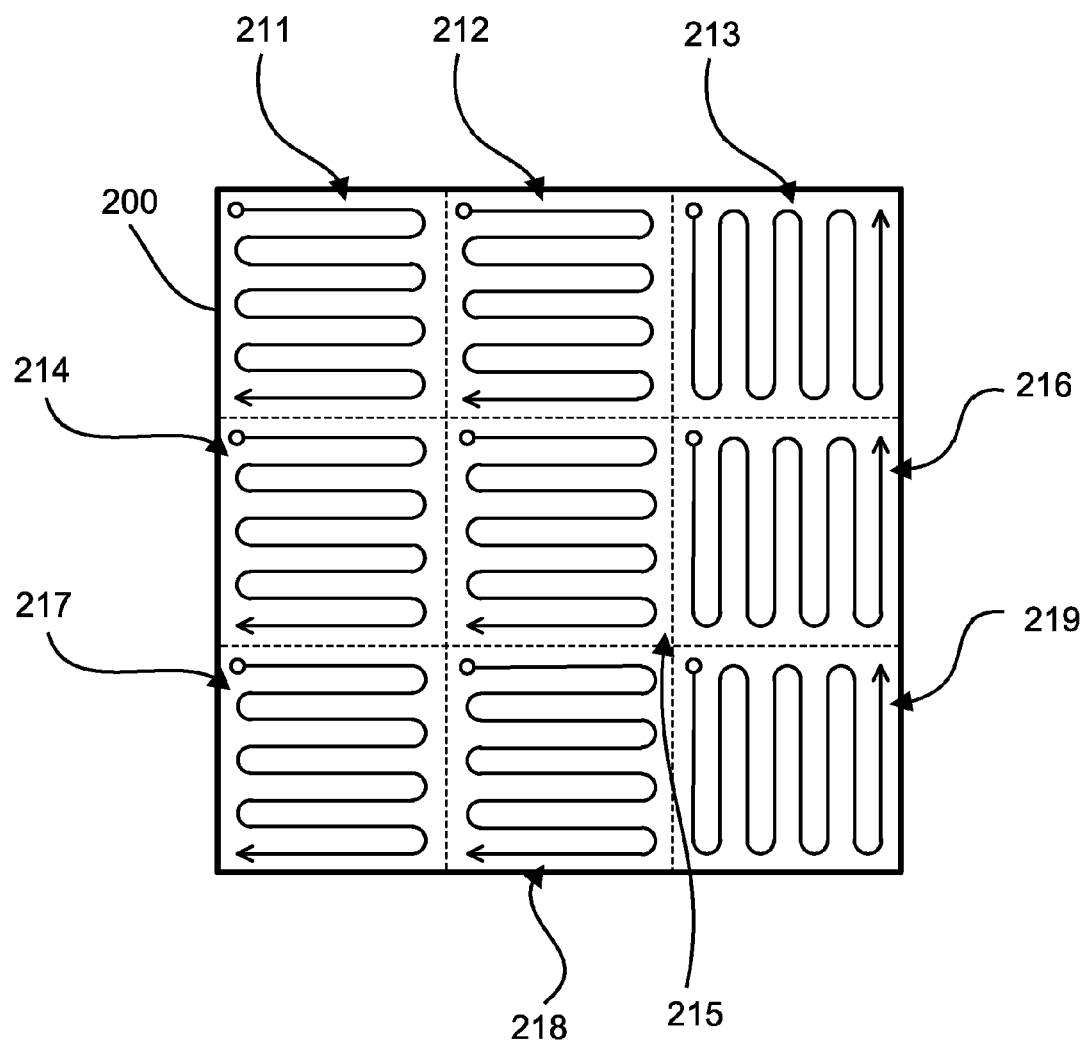
FIG. 11 shows the pixel generation paths chosen for each region of a page using the number of crossing locations in each region as the basis for pixel generation path selection.

It is desirable to select the pixel generation path that results in the fewest crossing locations, known as the optimal pixel generation path, and to use the optimal pixel generation path to rasterize a region. FIG. 10 shows the number of crossing locations when using pixel generation paths 900 and 950, for all regions 211-219 of the page 200. In an exemplary implementation, the selection of the optimal pixel generation path is performed on a region-by-region basis, to ensure that all regions are rasterized as fast as possible. With this approach, different regions of the page may be rasterized using different pixel generation paths. This is achieved by comparing the determined number of crossing locations associated with each available pixel generation path. From the comparison, the path with the least number of crossings is selected. FIG. 11 shows the pixel generation paths chosen for regions 211-219 based on the minimum of the number of crossing locations for each region shown in FIG. 10. In this example, if the number of crossing locations for both pixel generation paths 900 and 950 are equal, pixel generation path 900 is chosen. Pixel generation path 900 is chosen for the rasterization of regions 211, 212, 214, 215, 217, and 218. Pixel generation path 950 is chosen for the rasterization of regions 213, 216, and 219.

The present arrangements provide for regions of the page to be processed in isolation, so that many regions can be processed in parallel. In most cases, there will be more regions to process than there are processors available. In addition, not all regions will take the same amount of time to process; complex regions will take a longer time to process than simple regions. The overall time taken to process all regions will depend largely on how well the regions are distributed to the available processors. For example, if many complex regions are processed by a single processor, other processors may complete processing of their regions much earlier, and will be idle while the complex regions are processed. It is desirable that regions be distributed to processors in such a way as to minimise processor idle time, and therefore reduce the overall time taken to process the regions and thus render the entire page. This is commonly known as load balancing.

Figure 12:
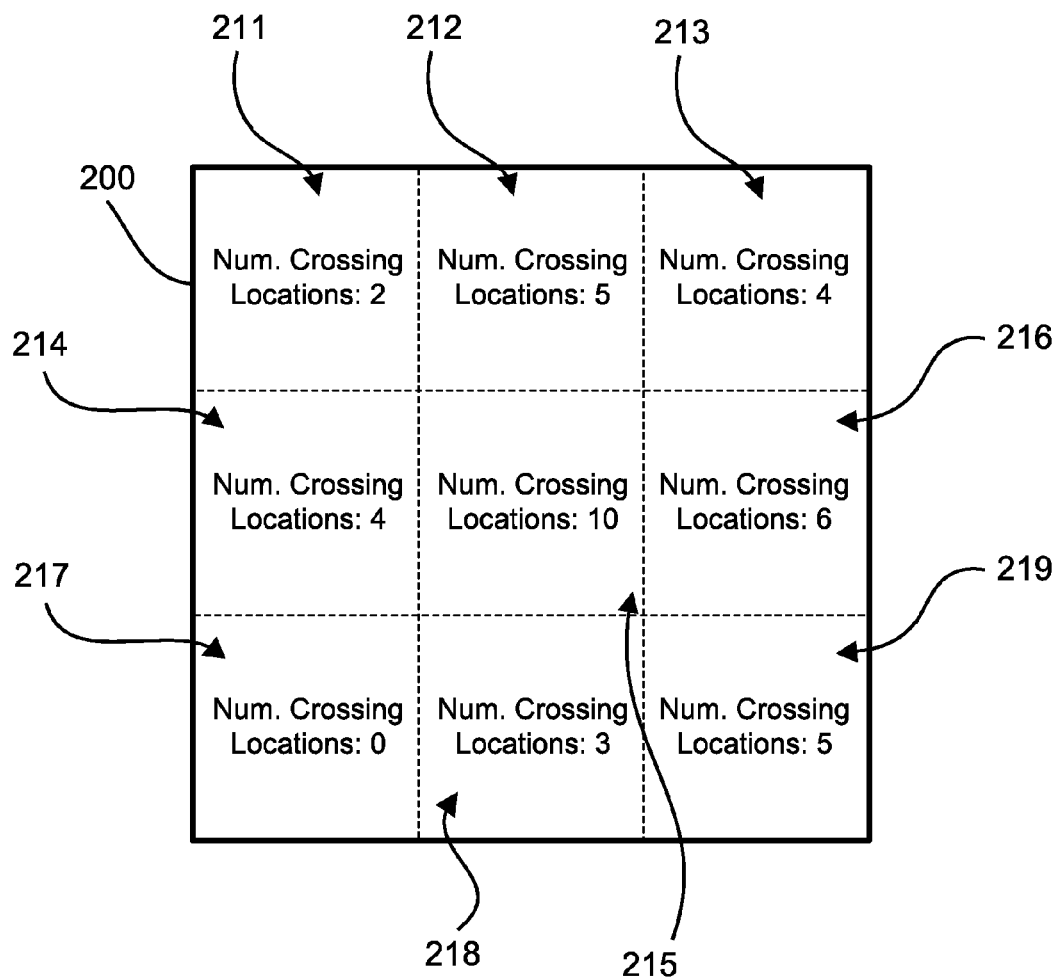
FIG. 12 shows the number of crossing locations for each region of the page using the optimal pixel generation paths chosen for each of the regions in the preferred embodiment.

Load balancing is facilitated herein using a method of determining the complexity of each region before the region is processed, so that the regions can be better distributed to the available processors. The counting of the number of crossing locations for each region given a pixel generation path for the region was previously described with reference to FIG. 10. Once the pixel generation path to use to rasterize a region is selected, the number of crossing locations in the region will be known. In a preferred implementation, the number of crossing locations is used as a measure of the complexity of each region. FIG. 12 shows the number of crossing locations for each region 211-219 of the page 200, using the optimal pixel generation paths that were chosen using the method previously described with reference to FIG. 10 and FIG. 11. This information is used to assign regions to the processors to use to rasterize those regions.

Figure 13A:
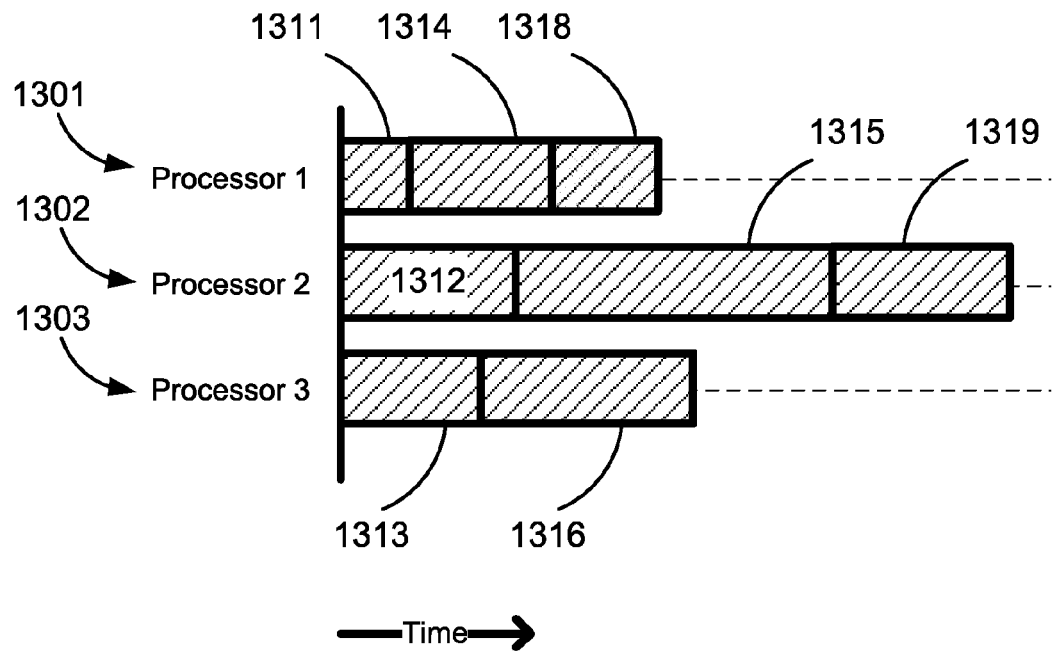
FIGS. 13a and 13b show the processing time for each processor when rasterizing regions of the page in parallel using three processors.

FIG. 13a shows a histogram representing the processing time of each region of page 200 by three processors 1301-1303, where regions are assigned to processors in region order without consideration of region complexity. Each bar 1311-1319 of the histogram corresponds to the processing time of a region. The length of a bar indicates how long it takes to process a region, and is proportional to the number of crossing locations within the region using the optimal pixel generation path for the region. Bar 1311 corresponds to the processing time of region 211. Bar 1312 corresponds to the processing time of region 212. Bar 1313 corresponds to the processing time of region 213. Bar 1314 corresponds to the processing time of region 214. Bar 1315 corresponds to the processing time of region 215. Bar 1316 corresponds to the processing time of region 216. Region 217 does not contain any crossing locations, and therefore takes a very small amount of time to process. Region 217 is therefore not represented by a bar in FIG. 13a. Bar 1318 corresponds to the processing time of region 218. Bar 1319 corresponds to the processing time of region 219. Processor 1 1301 is assigned regions 211, 214, and 218 (corresponding to bars 1311, 1314, and 1318, respectively). Processor 2 1302 is assigned regions 212, 215, and 219 (corresponding to bars 1312, 1315, and 1319, respectively). Processor 3 1303 is assigned regions 213 and 216 (corresponding to bars 1313 and 1316, respectively). Note that at the time that the regions are assigned to processors, the time taken to process each region is not known (as the complexity is not calculated). Processor 1 1301 and Processor 3 1303 complete their two assigned regions relatively quickly, and remain idle until Processor 2 1302 completes processing of its assigned regions. Processor 2 1302 takes a much longer time to complete processing of its assigned regions. Such a large difference between processor workloads is not desirable.

Figure 13B:
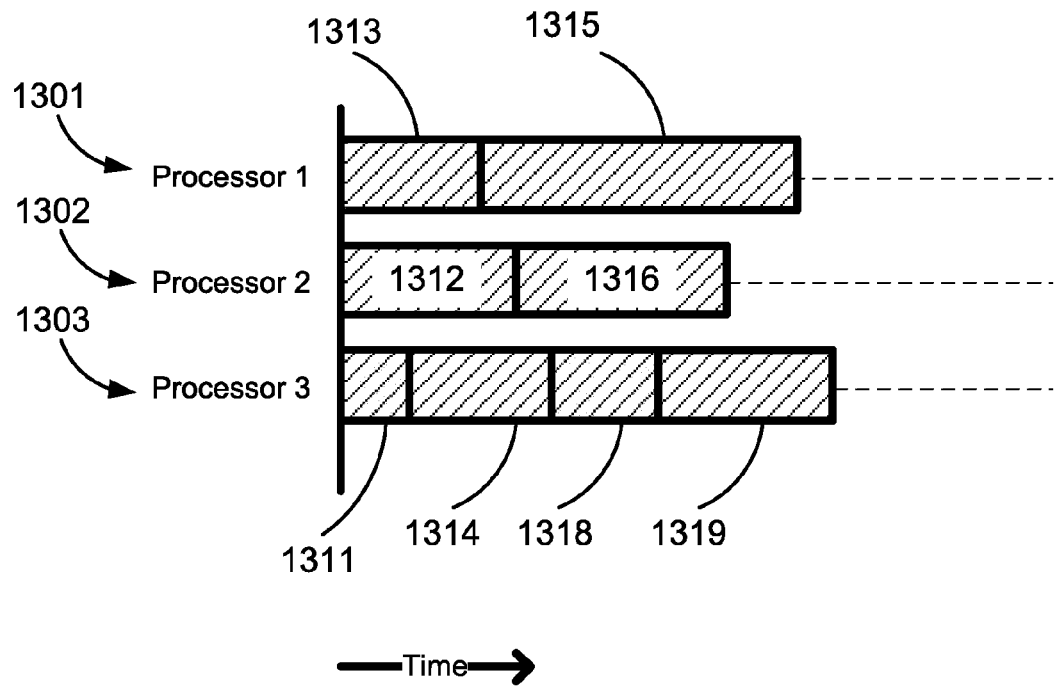

This problem is addressed by measuring the complexity of each region, and assigning regions to processors such that each processor processes regions with roughly the same total complexity. FIG. 13b shows a histogram of such an assignment of regions to processors such that an approximately equal number of pixel-aligned object edges are rasterized by each processor during a rasterizing of the page. The complexity of each region, and therefore its processing time, is now known before regions are assigned to processors. Processor idle time can be minimised, and the overall time taken to process all of the regions is reduced significantly. One of a number of scheduling algorithms known in the prior art can be used to assign regions to processors, once the complexity of each region is known. For example, the "round-robin" scheduling algorithm is very simple and effective, and is suitable for assigning regions to processors in the presently described arrangements.

Figure 14:
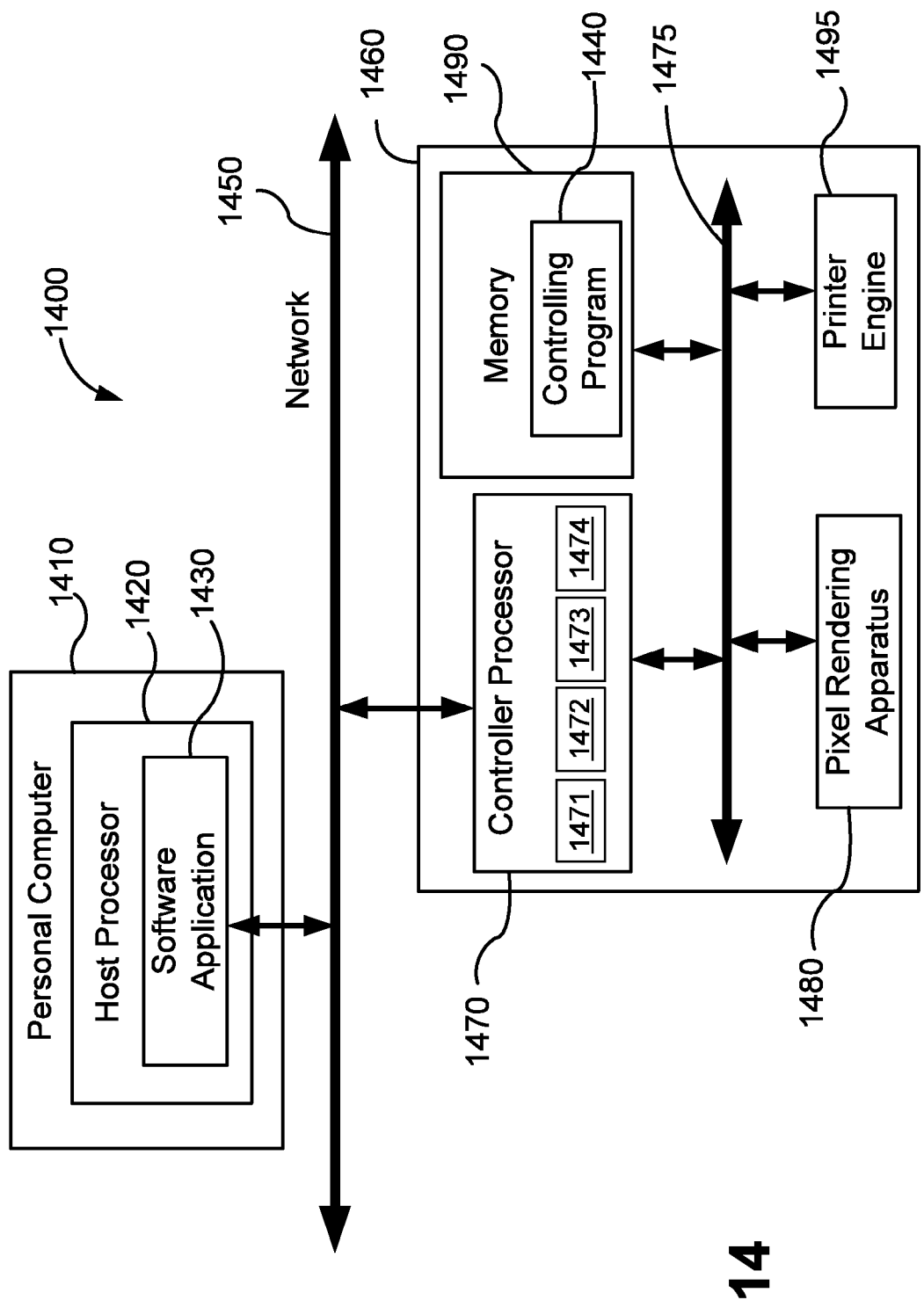
FIG. 14 shows a schematic block diagram of a pixel rendering system for rendering computer graphic object images according to the present disclosure.

FIG. 14 shows a schematic block diagram of a pixel rendering system 1400 for rendering computer graphic object images which are processed in accordance with the present disclosure. The pixel rendering system 1400 comprises a personal computer 1410 connected to a printer system 1460 through a network 1450. The network 1450 may be a typical network involving multiple personal computers, or may be a simple connection between a single personal computer 1410 and a printer system 1460.

The personal computer 1410 comprises a host processor 1420 for executing a software application 1430, such as a word processor or graphical software application.

The printer system 1460 comprises a multi-core controlling processor 1470, having in this case four processor cores 1471, 1472, 1473 and 1474, for executing a controlling program 1440 stored in a memory 1490, a pixel rendering apparatus 1480, memory 1490, and a printer engine 1495 coupled via a bus 1475. The pixel rendering apparatus 1480 is preferably in the form of an ASIC coupled via the bus 1475 to the controller processor 1470, memory 1490, and the printer engine 1495. However, the pixel rendering apparatus 1480 may also be implemented in software that is executed in the controller processor 1470.

The four processor cores 1471-1474 of the controlling processor 1470 may have one or more levels of CPU cache. A CPU cache is essentially a smaller and faster form of storage, and is used by a processor core to store copies of data and instructions from the most frequently used memory locations. The use of the CPU cache therefore reduces the average time to access stored data and instructions. Different architectures may have different CPU cache configurations. For example, in some architectures, each processor core 1471-1474 will have its own levels of CPU cache, while in other architectures, some levels of CPU cache will be shared between processor cores 1471-1474.

The controlling program 1440 will be executed by the controller processor 1470 in one or more threads. A thread has of a number of instructions or steps that are executed by a processor core 1471-1474 in sequence. The controlling program 1440 can be multi-threaded, meaning that different threads can be executed at the same time by different processor cores 1471-1474. The controlling program 1440 generates the fillmap representation of each region of the page in a separate thread. In one exemplary implementation, each thread is executed on single processor core 1471-1474 to take full advantage of the CPU cache that is associated with each processor core 1471-1474.

Additional threads may also be executed by the controller processor 1470. These threads may include the main thread used to create threads for generating fillmap representations of regions, and the threads of an operating system that may also be running on the controller processor 1470. These additional threads may be executed by a processor core 1471-1474, or by any additional processor cores that are not used to execute threads or the present invention.

Figure 19A:
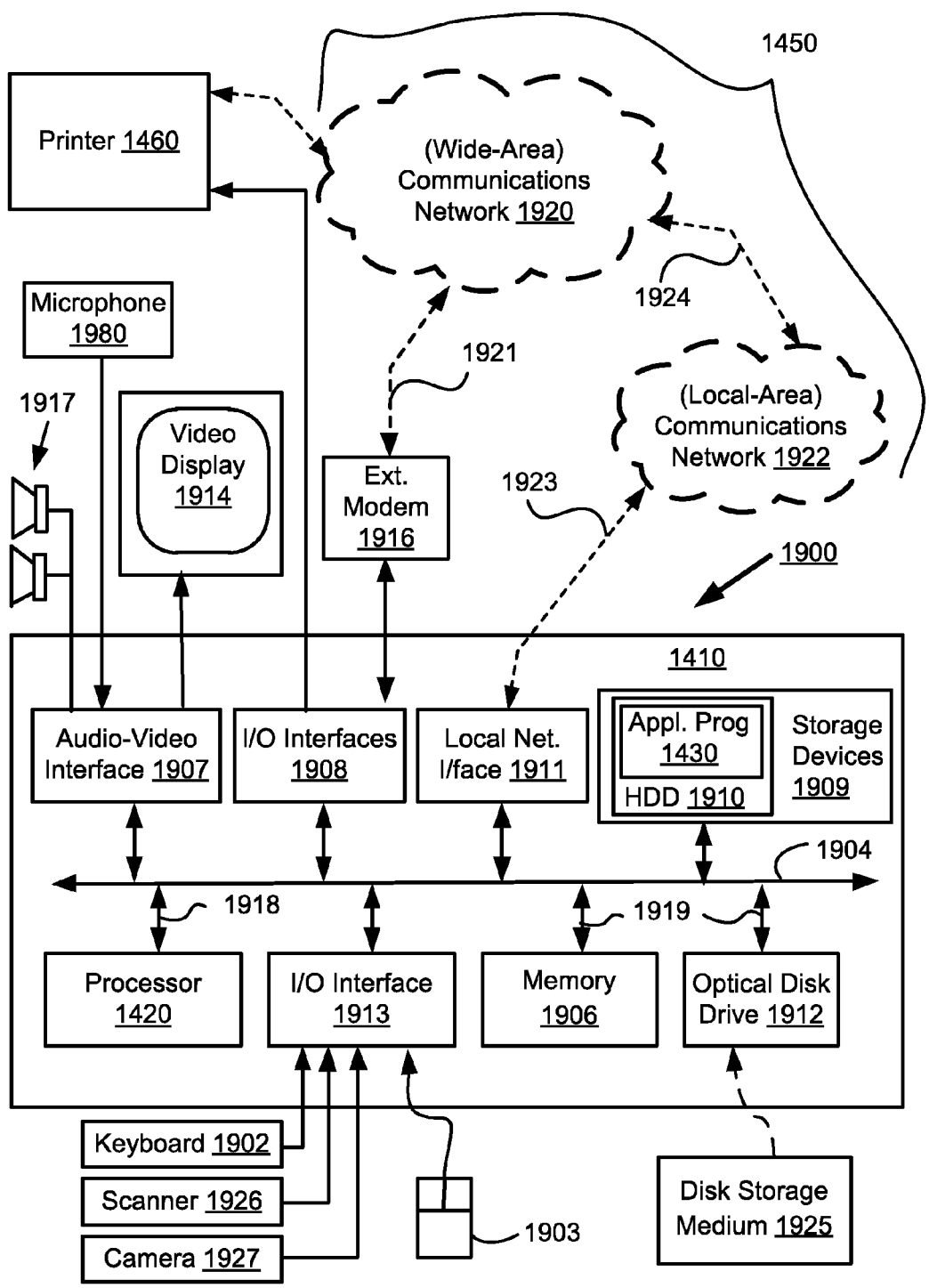
FIGS. 19A and 19B collectively form a schematic block diagram of general purpose computer system in which the arrangement of FIG. 14 may be implemented.
Figure 19B:
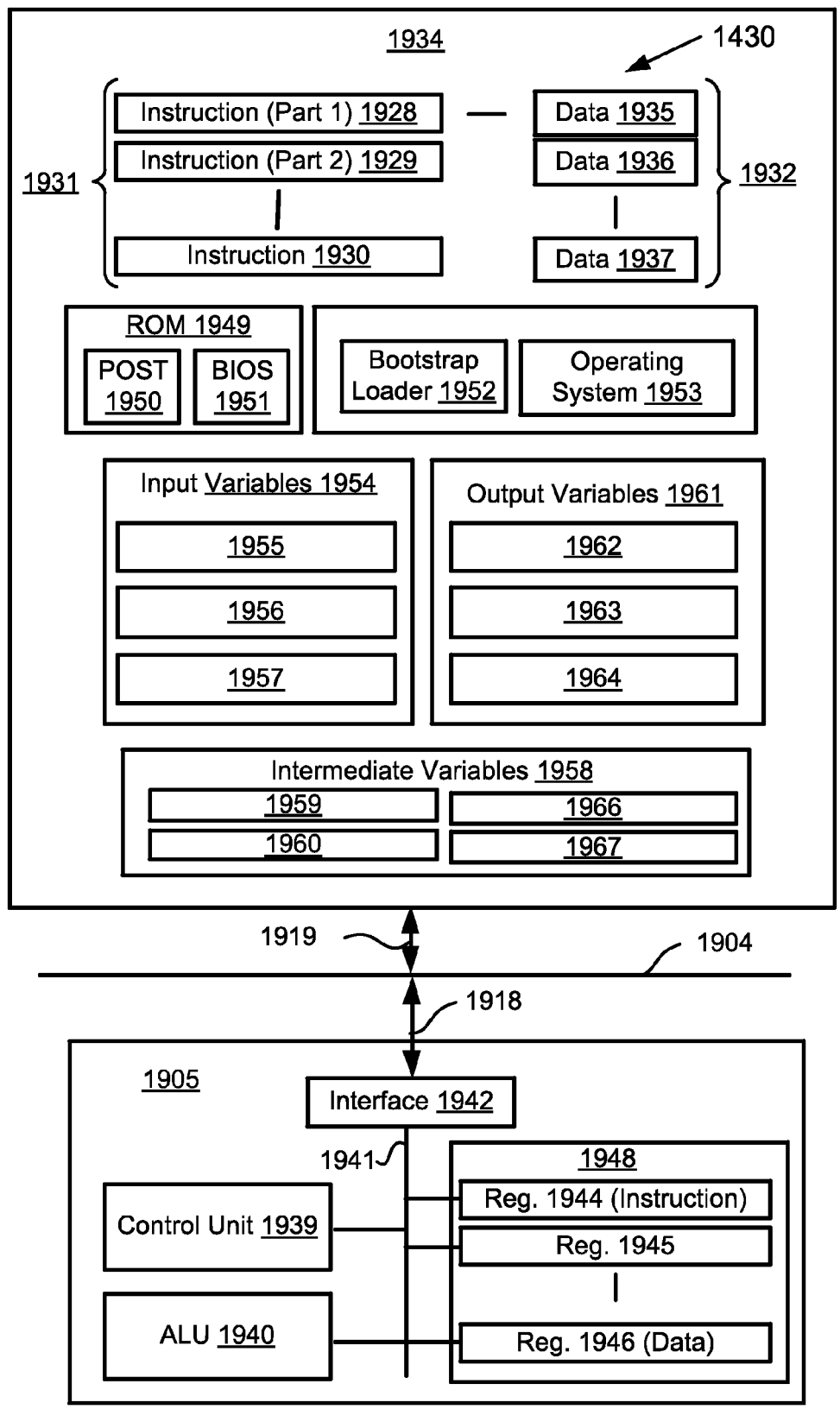

FIGS. 19A and 19B depict a general-purpose computer system 1900, upon which the various arrangements described can be practised.

As seen in FIG. 19A, the computer system 1900 includes: the personal computer module 1410; input devices such as a keyboard 1902, a mouse pointer device 1903, a scanner 1926, a camera 1927, and a microphone 1980; and output devices including a printer 1460, a display device 1914 and loudspeakers 1917. An external Modulator-Demodulator (Modem) transceiver device 1916 may be used by the computer module 1410 for communicating to and from a communications network 1920 via a connection 1921. The communications network 1920 may be a wide-area network (WAN), such as the Internet, a cellular telecommunications network, or a private WAN. Where the connection 1921 is a telephone line, the modem 1916 may be a traditional "dial-up" modem. Alternatively, where the connection 1921 is a high capacity (e.g., cable) connection, the modem 1916 may be a broadband modem. A wireless modem may also be used for wireless connection to the communications network 1920. The components 1920-1924 may be consider equivalent to and an exemplary implementation of the network 1450 of FIG. 14, to which the printer 1460 may also directly couple, as seen in FIG. 19A.

The computer module 1410 typically includes at least one processor unit 1420, and a memory unit 1906. For example, the memory unit 1906 may have semiconductor random access memory (RAM) and semiconductor read only memory (ROM). The computer module 1410 also includes an number of input/output (I/O) interfaces including: an audio-video interface 1907 that couples to the video display 1914, loudspeakers 1917 and microphone 1980; an I/O interface 1913 that couples to the keyboard 1902, mouse 1903, scanner 1926, camera 1927 and optionally a joystick or other human interface device (not illustrated); and an interface 1908 for the external modem 1916 and printer 1460. In some implementations, the modem 1916 may be incorporated within the computer module 1410, for example within the interface 1908. The computer module 1410 also has a local network interface 1911, which permits coupling of the computer system 1900 via a connection 1923 to a local-area communications network 1922, known as a Local Area Network (LAN). As illustrated in FIG. 19A, the local communications network 1922 may also couple to the wide network 1920 via a connection 1924, which would typically include a so-called "firewall" device or device of similar functionality. The local network interface 1911 may comprise an Ethernet™ circuit card, a Bluetooth™ wireless arrangement or an IEEE 802.11 wireless arrangement; however, numerous other types of interfaces may be practiced for the interface 1911.

The I/O interfaces 1908 and 1913 may afford either or both of serial and parallel connectivity, the former typically being implemented according to the Universal Serial Bus (USB) standards and having corresponding USB connectors (not illustrated). Storage devices 1909 are provided and typically include a hard disk drive (HDD) 1910. Other storage devices such as a floppy disk drive and a magnetic tape drive (not illustrated) may also be used. An optical disk drive 1912 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1900.

The components 1420 to 1913 of the computer module 1410 typically communicate via an interconnected bus 1904 and in a manner that results in a conventional mode of operation of the computer system 1900 known to those in the relevant art. For example, the processor 1420 is coupled to the system bus 1904 using a connection 1918. Likewise, the memory 1906 and optical disk drive 1912 are coupled to the system bus 1904 by connections 1919. Examples of computers on which the described arrangements can be practised include IBM-PC's and compatibles, Sun Sparcstations, Apple Mac™ or a like computer systems.

The software application program 1430 is executable within the computer system 1900. In particular, the steps of the application 1430 are effected by instructions 1931 (see FIG. 19B) in the software 1430 that are carried out within the computer system 1900. The software instructions 1931 may be formed as one or more code modules, each for performing one or more particular tasks. The software may also be divided into two separate parts, in which a first part and the corresponding code modules performs the application (e.g. word processing or graphical imaging) methods and a second part and the corresponding code modules manage a user interface between the first part and the user.

The software may be stored in a computer readable medium, including the storage devices described below, for example. The software is loaded into the computer system 1900 from the computer readable medium, and then executed by the computer system 1900. A computer readable medium having such software or computer program recorded on the computer readable medium is a computer program product. The use of the computer program product in the computer system 1900 effects apparatus for graphical document generation.

The software 1430 is typically stored in the HDD 1910 or the memory 1906. The software is loaded into the computer system 1900 from a computer readable medium, and executed by the computer system 1900. Thus, for example, the software 1430 may be stored on an optically readable disk storage medium (e.g., CD-ROM) 1925 that is read by the optical disk drive 1912. A computer readable medium having such software or computer program recorded on it is a computer program product. The use of the computer program product in the computer system 1900 preferably effects an apparatus for graphical document generation.

In some instances, the application programs 1430 may be supplied to the user encoded on one or more CD-ROMs 1925 and read via the corresponding drive 1912, or alternatively may be read by the user from the networks 1920 or 1922. Still further, the software can also be loaded into the computer system 1900 from other computer readable media. Computer-readable storage media refers to any non-transitory storage medium that provides recorded instructions and/or data to the computer system 1900 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the computer module 1410. Examples of computer readable transmission (transitory) media that may also participate in the provision of software, application programs, instructions and/or data to the computer module 1410 include radio or infra-red transmission channels as well as a network connection to another computer or networked device, and the Internet or Intranets including e-mail transmissions and information recorded on Websites and the like.

The second part of the application programs 1430 and the corresponding code modules mentioned above may be executed to implement one or more graphical user interfaces (GUIs) to be rendered or otherwise represented upon the display 1914. Through manipulation of typically the keyboard 1902 and the mouse 1903, a user of the computer system 1900 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1917 and user voice commands input via the microphone 1980.

FIG. 19B is a detailed schematic block diagram of the processor 1420 and a "memory" 1934. The memory 1934 represents a logical aggregation of all the memory modules (including the HDD 1909 and semiconductor memory 1906) that can be accessed by the computer module 1410 in FIG. 19A.

When the computer module 1410 is initially powered up, a power-on self-test (POST) program 1950 executes. The POST program 1950 is typically stored in a ROM 1949 of the semiconductor memory 1906 of FIG. 19A. A hardware device such as the ROM 1949 storing software is sometimes referred to as firmware. The POST program 1950 examines hardware within the computer module 1410 to ensure proper functioning and typically checks the processor 1420, the memory 1934 (1909, 1906), and a basic input-output systems software (BIOS) module 1951, also typically stored in the ROM 1949, for correct operation. Once the POST program 1950 has run successfully, the BIOS 1951 activates the hard disk drive 1910 of FIG. 19A. Activation of the hard disk drive 1910 causes a bootstrap loader program 1952 that is resident on the hard disk drive 1910 to execute via the processor 1420. This loads an operating system 1953 into the RAM memory 1906, upon which the operating system 1953 commences operation. The operating system 1953 is a system level application, executable by the processor 1420, to fulfil various high level functions, including processor management, memory management, device management, storage management, software application interface, and generic user interface.

The operating system 1953 manages the memory 1934 (1909, 1906) to ensure that each process or application running on the computer module 1410 has sufficient memory in which to execute without colliding with memory allocated to another process. Furthermore, the different types of memory available in the system 1900 of FIG. 19A must be used properly so that each process can run effectively. Accordingly, the aggregated memory 1934 is not intended to illustrate how particular segments of memory are allocated (unless otherwise stated), but rather to provide a general view of the memory accessible by the computer system 1900 and how such is used.

As shown in FIG. 19B, the processor 1420 includes a number of functional modules including a control unit 1939, an arithmetic logic unit (ALU) 1940, and a local or internal memory 1948, sometimes called a cache memory. The cache memory 1948 typically include a number of storage registers 1944-1946 in a register section. One or more internal busses 1941 functionally interconnect these functional modules. The processor 1420 typically also has one or more interfaces 1942 for communicating with external devices via the system bus 1904, using a connection 1918. The memory 1934 is coupled to the bus 1904 using a connection 1919.

The application program 1430 includes a sequence of instructions 1931 that may include conditional branch and loop instructions. The program 1430 may also include data 1932 which is used in execution of the program 1430. The instructions 1931 and the data 1932 are stored in memory locations 1928, 1929, 1930 and 1935, 1936, 1937, respectively. Depending upon the relative size of the instructions 1931 and the memory locations 1928-1930, a particular instruction may be stored in a single memory location as depicted by the instruction shown in the memory location 1930. Alternately, an instruction may be segmented into a number of parts each of which is stored in a separate memory location, as depicted by the instruction segments shown in the memory locations 1928 and 1929.

In general, the processor 1420 is given a set of instructions which are executed therein. The processor 1105 waits for a subsequent input, to which the processor 1420 reacts to by executing another set of instructions. Each input may be provided from one or more of a number of sources, including data generated by one or more of the input devices 1902, 1903, data received from an external source across one of the networks 1920, 1902, data retrieved from one of the storage devices 1906, 1909 or data retrieved from a storage medium 1925 inserted into the corresponding reader 1912, all depicted in FIG. 19A. The execution of a set of the instructions may in some cases result in output of data. Execution may also involve storing data or variables to the memory 1934.

The disclosed arrangements may use input variables 1954, which are stored in the memory 1934 in corresponding memory locations 1955, 1956, 1957. The arrangements may produce output variables 1961, which are stored in the memory 1934 in corresponding memory locations 1962, 1963, 1964. Intermediate variables 1958 may be stored in memory locations 1959, 1960, 1966 and 1967.

Referring to the processor 1420 of FIG. 19B, the registers 1944, 1945, 1946, the arithmetic logic unit (ALU) 1940, and the control unit 1939 work together to perform sequences of micro-operations needed to perform "fetch, decode, and execute" cycles for every instruction in the instruction set making up the program 1430. Each fetch, decode, and execute cycle comprises:

(a) a fetch operation, which fetches or reads an instruction 1931 from a memory location 1928, 1929, 1930;

(b) a decode operation in which the control unit 1939 determines which instruction has been fetched; and (c) an execute operation in which the control unit 1939 and/or the ALU 1940 execute the instruction.

Thereafter, a further fetch, decode, and execute cycle for the next instruction may be executed. Similarly, a store cycle may be performed by which the control unit 1939 stores or writes a value to a memory location 1932.

Each step or sub-process in the processes described is typically associated with one or more segments of the program 1430 and is performed by the register section 1944, 1945, 1947, the ALU 1940, and the control unit 1939 in the processor 1420 working together to perform the fetch, decode, and execute cycles for every instruction in the instruction set for the noted segments of the program 1430.

Operation of the printer system 1460 is typically akin to that of the personal computer in terms of storage and execution of the control program 1440 by the memory 1490 and processor 1470 respectively. The pixel rendering apparatus 1480 may be a hardware module having its own processors, or may be entirely software implemented as an application executable by the processor 1470, or a combination of the two.

Returning to FIG. 14, in the pixel rendering system 1400, the software application 1430 creates page-based documents, where each page contains objects such as text, lines, fill regions, and image data. The software application 1430 sends a high-level description of the page (for example a PDL file) to the controlling program 1440 that is executed in the controller processor 1470 of the printer system 1460 via the network 1450.

The controlling program 1440 receives the description of the page from the software application 1430, and generates a fillmap representation of the page. The fillmap representation of a page is an example of an intermediate representation as discussed above. The controlling program 1440 will later be described with reference to FIG. 15.

The controlling program 1440, as executed by the controlling processor 1470, is also responsible for providing memory by allocating space within the memory 1490 for the pixel rendering apparatus 1480, initialising the pixel rendering apparatus 1480, and instructing the pixel rendering apparatus 1480 to start rendering the fillmap representation of the page to pixels.

The controlling program 1440 instructs the processor 1470 to send the fillmap representation of the page to the pixel rendering apparatus 1480. The pixel rendering apparatus 1480 then uses the fillmap representation to render the page to pixels. The output of the pixel rendering apparatus 1480 is a raster representation of the page made up of colour pixel data, which may be used by the printer engine 1495.

The printer engine 1495 then prints the raster representation of the page onto print media such as paper.

Figure 15:
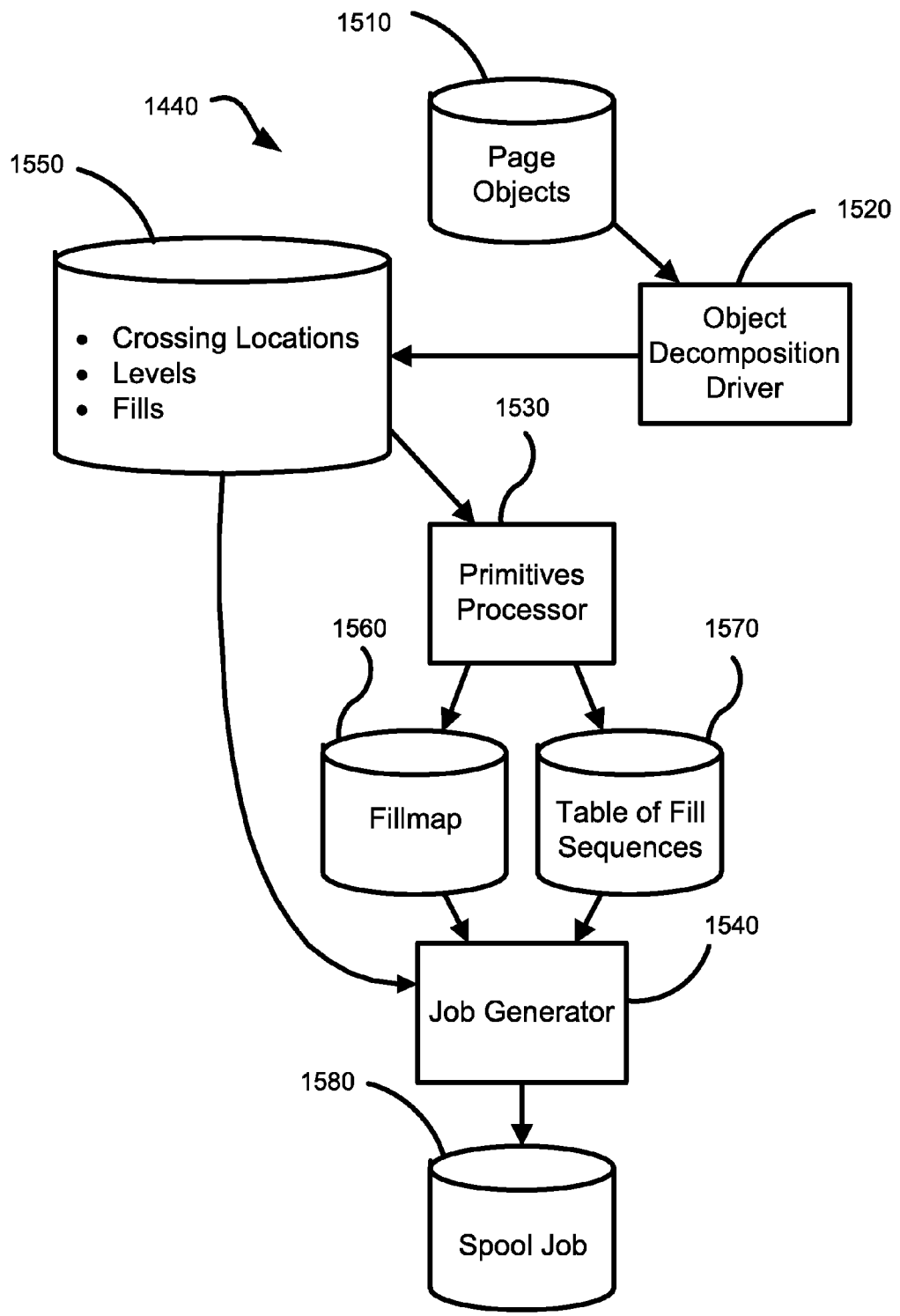
FIG. 15 shows a schematic block diagram of a controlling program for the pixel rendering system shown in FIG. 14.

General operation of the controlling program 1440 will now be outlined with reference to FIG. 15. The controlling program 1440 includes an object decomposition driver 1520, a primitives processor 1530 and a job generator 1540. The controlling program 1440 receives the page representation from the software application 1430. The page representation is composed of page objects 1510. The object decomposition driver 1520 decomposes the page objects 1510 into decomposed object data 1550 including crossing locations, levels, and fills. A fill may be a flat fill representing a single colour, a blend representing a colour which varies according to a predetermined function such as a linear gradient or sinusoid, a bitmap image, or a tiled (i.e. repeated) image.

Within the controlling program 1440, a primitives processor 1530 then further processes the decomposed object data 1550 including the crossing locations, levels, and fills to generate a fillmap representation 1560 of the page and a table of fill sequences 1570. After the fillmap 1560 and the table of fill sequences 1570 have been generated, a job generator 1540 generates a spool job 1580 incorporating the fillmap representation 1560 of the page, the table of fill sequences 1570, together with the object fills from the decomposed data 1550. The controlling program 1440 sends the spool job 1580 to the pixel rendering apparatus 1480 for rendering to pixels.

Figure 16:
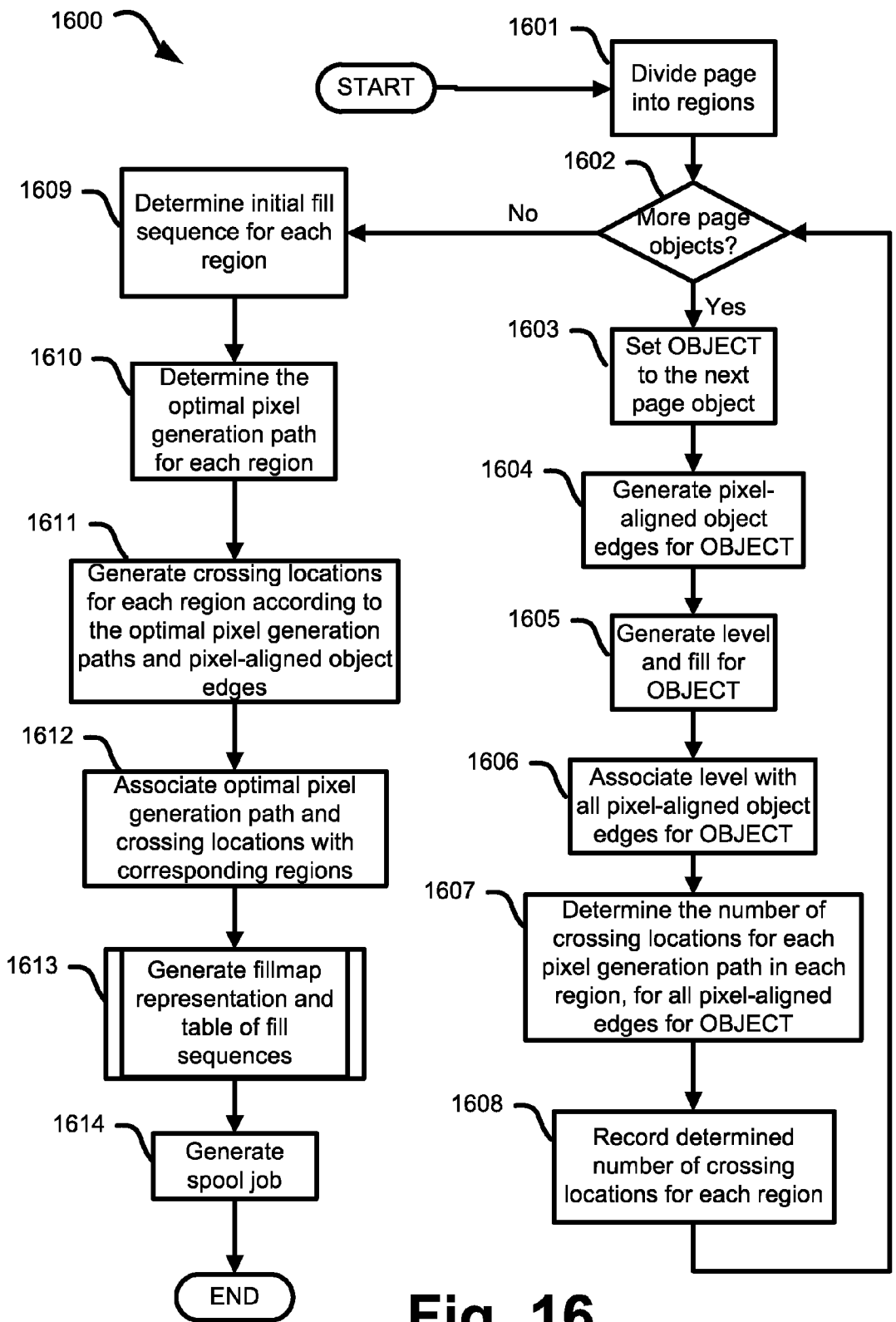
FIG. 16 shows a flow chart of a controlling program in the pixel rendering system shown in FIG. 14.

A preferred method 1600 used by the controlling program 1440 to process page objects will now be described with reference to the flowchart of FIG. 16. The method 1600 starts and proceeds to a dividing step 1601 where the page to be rendered is divided by the processor 1470 into regions. Processing then proceeds to determining step 1602 where the controlling program 1440 via the processor 1470 determines if there are remaining page objects to be processed. If it is determined that there are page objects remaining to be processed, then processing proceeds to a setting step 1603 where the next unprocessed object is set by the processor 1470 to the variable OBJECT. Processing then proceeds to an edge generating step 1604 where pixel-aligned object edges are generated by the processor 1470 for the page object stored in the variable OBJECT. The pixel-aligned object edges are stored in memory 1490 until they can be used in a later step to generate the crossing locations for the regions that the pixel-aligned object edges overlap. Processing then proceeds to a level and fill generating step 1605 where a level and fill are generated by the processor 1470 for the page object stored in the variable OBJECT. Processing then proceeds to associating step 1606 where the level that was generated at generating step 1605 is assigned by the processor 1470 to all pixel-aligned object edges that were generated at edge generating step 1604 for the page object stored in the variable OBJECT.

Processing then proceeds to determining step 1607 where, for each pixel-aligned object edge generated for the object stored in variable OBJECT, the number of crossing locations for each pixel generation path for each region is determined by the processor 1470. The calculation of the number of crossing locations needed for different pixel generation paths in a region was described previously with reference to FIG. 10 and FIG. 11. Processing then proceeds to a recording step 1608 where the number of crossing locations for each pixel generation path in each region determined in determining step 1607 is associated with the corresponding regions by the processor 1470 and recorded memory 1490. This information will be used later to determine the optimal pixel generation path for each region. Processing then returns to the decision step 1602.

If it is determined in decision step 1602 that there are no more input page objects left to process, then processing proceeds to fill determining step 1609, where the initial fill sequence for each region is determined by the processor 1470. The initial fill sequence once determined is stored in memory 1490. Processing then proceeds to a path determining step 1610 where the optimal pixel generation path for each region of the page is determined by the processor 1470. The determination of the optimal pixel generation path for a region was described previously with reference to FIG. 9, FIG. 10 and FIG. 11. Processing then proceeds to step 1611 where the crossing locations for each region of the page are generated, according to the pixel-aligned edges and the optimal pixel generation path that was determined in the previous step. Processing proceeds to associating step 1612 where the optimal pixel generation path and crossing locations are associated by the processor 1470 with the corresponding regions. The generated crossing locations and the optimal pixel generation path for each region will be used later to rasterize the associated region.

Processing then proceeds to fillmap generating step 1613 where the fillmap representation of the page is generated. The process of generating the fillmap representation of the page will be described later with reference to FIG. 17. Processing then proceeds to step 1614, where a spooled job is generated by the processor 1470 based on the fillmap representation. Processing terminates upon the completion of step 1614.

Figure 17:
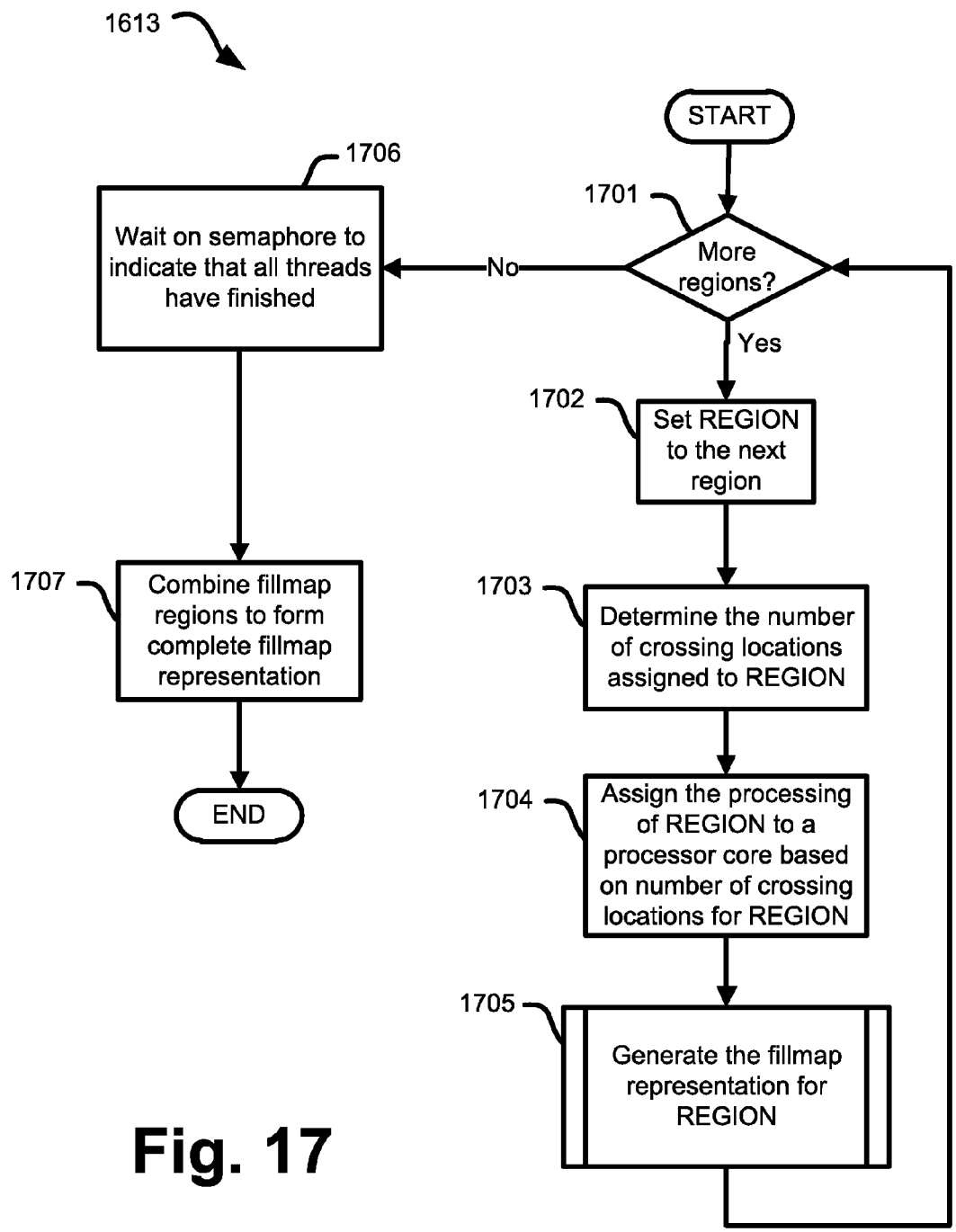
FIG. 17 shows a flow chart of the process of generating a fillmap representation of a page.

The process 1613 of generating a fillmap representation in accordance with an exemplary implementation will now be described with reference to FIG. 17. The process 1613 starts and proceeds to decision step 1701, where the processor 1470 determines if there are more regions of the page to process. If it is determined that there are more regions to process, processing proceeds to a setting step 1702, where the next region of the page to be processed is set by the processor 1470 to the variable REGION. Processing then proceeds to step 1703 where the number of crossing locations assigned to the region stored in variable REGION is determined by the processor 1470. The method 1613 then proceeds to step 1704 where the processing of the region stored in variable REGION is assigned by the processor 1470 to one of the processor cores 1471-1474 based on the number of crossing locations assigned to the variable stored in variable REGION. The process of determining the number of crossing locations of a region and subsequently assigning regions to processor cores 1471-1474 such that processor idle time and overall processing time is reduced was described previously with reference to FIG. 12 and FIG. 13. In an exemplary arrangement, region complexity is determined based on the number of crossing locations assigned to the region. In other implementations, other measures of region complexity may be used.

Processing proceeds to generation step 1705 where the generation of a fillmap for the region stored in variable REGION using the region's assigned processor core 1471-1474 is started by the processor 1470. The generation of the fillmap for the region stored in variable REGION may begin immediately, or may begin at a later time if the region's assigned processor core 1471-1474 is currently processing another region. Due to previous steps of generating vertical and horizontal crossing locations and initial fill sequences, each region can be processed in isolation on its own processor core.

In a multi-core or multi-processor system, many regions can therefore be processed in parallel, which reduces the time taken to process all regions. Preferred implementations take advantage of a multi-processor or multi-core system, where each processor core can be used to generate a corresponding fillmap representation in parallel. In other implementations, such as in a single-processor system, regions can be processed sequentially. Such implementations may be appropriate where advantages of using different pixel generation paths for the generation of different regions are desired to be implemented in a single-processor system, for example via a software upgrade, rather than a hardware upgrade of equipment replacement. The process 1705 of generating the fillmap for a region of the page will be described later with reference to FIG. 18.

The processing of step 1613 then returns to step 1701. If it is determined in step 1701 by the processor 1470 that there are no more regions left to process, then processing proceeds to step 1706, where the main process 1613 waits on a semaphore to indicate that each processor core 1471-1474 has finished generating the fillmap representation of the corresponding assigned regions. Subsequent steps in the process 1613 require each fillmap representation to have been completely generated for all regions of the page. Therefore, processing cannot continue until all processor cores 1471-1474 have completed generation of the fillmap for their assigned regions. Note that this is not the only way of halting processing until all threads are complete. For example, the main process 1613 could, at small time intervals, check a counter that indicates the number of processor cores still processing. When the counter becomes zero, the main process 1613 can proceed to the next step 1707.

When all threads have finished processing, then processing proceeds to step 1707, where all fillmap regions that were generated are combined by the processor 1470 to form single fillmap representation for the complete page. Typically, each region contains an integral number of fillmap tiles. This makes the combining of fillmap regions to form a single complete fillmap trivial. In other implementations, there may not be a N:1 correspondence between fillmap tiles and fillmap regions. In this case, some additional processing may be required in order to generate the complete fillmap at combining step 1707. Processing terminates upon the completion of combining step 1707.

A preferred process 1705 of generating a fillmap representation of a region of the page will now be described with reference to FIG. 18. The process 1705 uses a single continuous pixel generation path, such as the pixel generation paths shown in FIG. 9a and FIG. 9b, to generate a fillmap representation of the region. If the pixel generation path is not continuous, additional steps may be required to proceed to the next pixel in the pixel generation path and update the fill sequence, when there is a break in the pixel generation path. However, a similar process of pixel traversal and fill sequence updating is used no matter the pixel generation path.

The process 1705 starts and proceeds to a first setting step 1802 where the optimal pixel generation path is used to generate the fillmap for the region stored in variable REGION is set by the processor 1470 to the variable PIXGEN_PATH. Processing then proceeds to a second setting step 1803 where the location of the first pixel of the pixel generation path stored in the variable PIXGEN_PATH for the region stored in variable REGION is stored in the variable CURRENT_LOC. Processing then proceeds to third setting step 1804 where the initial fill sequence for the region stored in variable REGION is set to the variable FILL_SEQ.

Processing proceeds to a decision step 1805, where the processor 1470 determines if there are more crossing locations to process for the region stored in variable REGION. If it is determined that there are more crossing locations to process, processing proceeds to step 1806 where the next crossing location along the pixel generation path stored in variable PIXGEN_PATH is set to the variable CROSSING_LOC. Processing then proceeds to updating step 1807 where the fillmap corresponding to the region stored in variable REGION is updated according to the fill sequence stored in variable FILL_SEQ, for the pixels that are between the current pixel at the location stored in variable CURRENT_LOC and the location of the crossing location stored in variable CROSSING_LOC along the pixel generation path stored in variable PIXGEN_PATH.

Processing proceeds to step 1808 where the location of the pixel following the location of the crossing location stored in variable CROSSING_LOC along the pixel generation path stored in variable PIXGEN_PATH is set to the variable CURRENT_LOC. Processing then proceeds to updating step 1809 where the fill sequence that is stored in variable FILL_SEQ is updated according to the level that is associated with the crossing location stored in variable CROSSING_LOC. The fill sequence is updated by adding the level to the fill sequence at the position corresponding to the z-value of the level, if the crossing location activates the level, or by removing the level from the fill sequence, if the crossing location deactivates the level. Processing then returns to decision step 1805.

If it is determined in decision step 1805 that there are no more crossing locations left to process for the region stored in variable REGION, then processing proceeds to updating step 1810, where the fillmap region corresponding to the region stored in variable REGION is updated according to the fill sequence stored in variable FILL_SEQ, for the pixels between the current pixel at the location stored in variable CURRENT_LOC and the last pixel of the pixel generation path stored in variable PIXGEN_PATH, along the pixel generation path stored in variable PIXGEN_PATH. Processing terminates upon the completion of step 1810. Process 1705 preferably executes on a single processor core 1471-1474, to take full advantage of data and instructions that are stored in any CPU cache levels that are associated with the processor core. Preferably, multiple versions of process 1705 will be executing on different processor cores 1471-1474 at any one time, each version generating the fillmap representation of a different region of the page.

Figure 18:
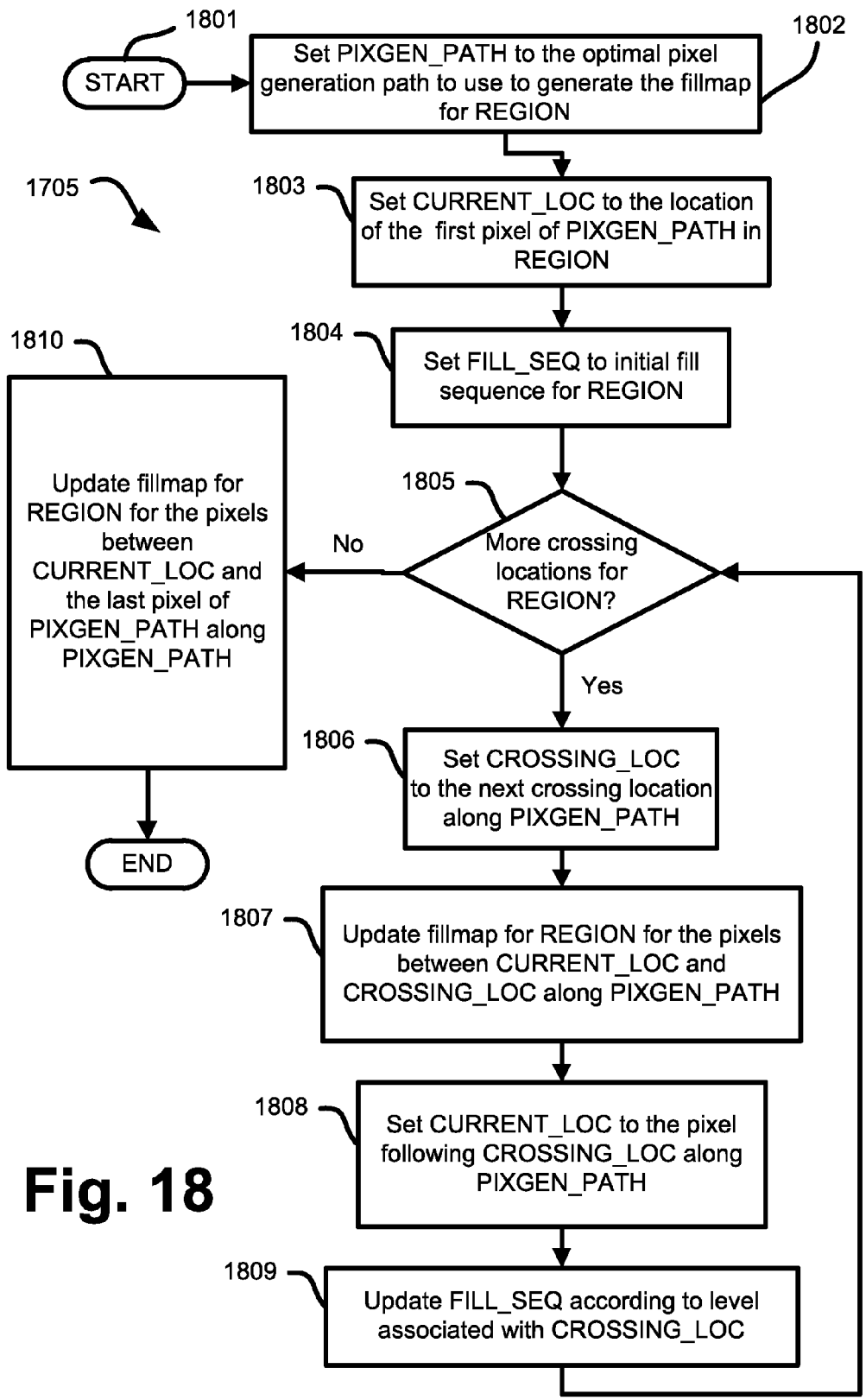
FIG. 18 shows a flow chart of the process of generating a fillmap representation of a region of the page.

The result of the rasterization of a region of the page according to the process of FIG. 18 is a fillmap representation of the region. In other implementations, this approach can be used to generate regions of other forms of intermediate representation, or pixel values directly.

The arrangements described above allow individual regions of the page to be rasterized in isolation, so that they can be rasterized in parallel on a multi-core or multi-processor system. Rasterizing multiple regions of the page in parallel reduces the overall time to rasterize the page. One problem with the prior art is that objects that overlap multiple regions need to be scan-converted multiple times, once for each region. The present approach avoids this problem by scan-converting each object once only, generating crossing locations, and assigning those crossing locations to the appropriate regions. Other prior art splits high-level object descriptions at tile boundaries, which is complex and can introduce mathematical error. The present approach avoids this problem by first generating pixel-aligned object edges, which are then used to create crossing locations according to region boundaries and a pixel generation path. This process is simple, and error is avoided. The present approach therefore displays significant advantage over the prior art.

In addition to reducing overall processing time through multi-threading, the present approach displays other advantages due to more efficient use of CPU caches. In the present arrangements, each thread is rasterizing only a small area of the page. The reduced amount of data that the rasterization process must deal with is more likely to fit inside the CPU cache, resulting in fewer cache misses and less access to main memory.

Other aspects of the present disclosure also provide advantages. The selection of the optimal pixel generation path to use to rasterize a region means that each thread has minimal amount of processing to perform. The fewer amount of edge crossings required, when using the optimal pixel generation path, also means that less memory is required. In an exemplary implementation, the number of edge crossings in a region is then used to gauge the complexity of the region. The complexity of each region is then used to allocate regions to processors in such a way as to minimise processor idle time, and therefore minimise overall processing time.

INDUSTRIAL APPLICABILITY

The arrangements described are applicable to the computer and data processing industries and particularly for the efficient printing of page object information.

The foregoing describes only some embodiments of the present invention, and modifications and/or changes can be made thereto without departing from the scope and spirit of the invention, the embodiments being illustrative and not restrictive.

We claim:

1. A computer-implementable method of rasterizing at least a portion of a page comprising a plurality of graphic objects, said method comprising:
   determining a single continuous pixel generation path for the portion of the page;
   determining a plurality of crossing locations based on the single continuous pixel generation path, the plurality of crossing locations comprising a vertical crossing location and a horizontal crossing location;
   determining an initial fill sequence of the single continuous pixel generation path at a predetermined location; and
   rasterizing the portion of the page according to the initial fill sequence and at least a subsequent fill sequence upon encountering each of said determined crossing locations along the single continuous pixel generation path.

2. A method of rasterizing at least a portion of a page comprising a plurality of graphic objects, said method comprising:
   determining a single pixel generation path for the portion of the page;
   determining a plurality of crossing locations based on the single pixel generation path, the plurality of crossing locations comprising a vertical crossing location and a horizontal crossing location;
   determining an initial fill sequence of the single pixel generation path at a predetermined location; and
   rasterizing the portion of the page according to the initial fill sequence and at least a subsequent fill sequence upon encountering each of said vertical crossing location and said horizontal crossing location along the single pixel generation path.

3. A computer-implementable method of rasterizing a page comprising a plurality of graphic objects, said method comprising:
   dividing the page into a plurality of regions, and
   for at least one of the plurality of regions:

determining a single pixel generation path for the portion of the page;
determining a plurality of crossing locations based on the single pixel generation path, the plurality of crossing locations comprising a vertical crossing location and a horizontal crossing location;
determining an initial fill sequence of the single pixel generation path at a predetermined location; and
rasterizing the portion of the page region according to the initial fill sequence and at least a subsequent fill sequence upon encountering each of said determined crossing locations along the single pixel generation path.

4. A method according to claim 3 wherein the determining of the single pixel generation path comprises selecting a pixel generation path from a predetermined set of available pixel generation paths.

5. A method according to claim 4 wherein the pixel generation path is determined by:
determining the number of crossing locations in the region with each of the available pixel generation paths;
comparing the determined number of crossing locations associated with each available pixel generation path; and
selecting an optimal pixel generation path from the set of available pixel generation paths based on the comparison of the number of crossing locations.

6. A method according to claim 4, wherein the crossing locations are determined based on a plurality of pixel-aligned object edges of the graphic objects.

7. A method according to claim 6 wherein the pixel generation path is determined by:
determining a number of the pixel-aligned object edges in the region with each of the available pixel generation paths;
comparing the determined number of pixel-aligned object edges associated with each available pixel generation paths; and
selecting an optimal pixel generation path from the set of available pixel generation paths based on said comparison of the number of pixel-aligned object edges.

8. A method according to claim 6 wherein the rasterizing of each region is performed by a corresponding processor, the method further comprising:
determining a number of pixel-aligned object edges associated with each region of the page; and
distributing the regions for rasterizing to a number of processors such that an approximately equal number of pixel-aligned object edges are rasterized by each of the plurality of processors during a rasterizing of the page.

9. A method according to claim 3 wherein the rasterizing of each region includes the determining of an initial fill sequence of each region, the method further comprising:
traversing a region path of the page;
updating a current fill sequence upon encountering said crossing locations that intersect the region path; and
setting the initial fill sequence of a region to the current fill sequence upon encountering a start of said region.

10. A method according to claim 3, wherein the pixel generation path is a continuous path.

11. A method according to claim 3, wherein the fill sequence is a sequence of levels used to generate a colour of at least one pixel of the page, each level of the sequence comprising a fill and an opacity of said level, a compositing operator and a priority of said level.

12. A method according to claim 3, wherein:
the vertical crossing location indicates a level activation or deactivation of a fill sequence when the pixel generation path is travelling in a vertical direction, either from top-to-bottom or bottom-to-top;
the horizontal crossing location indicates a level activation or deactivation of a fill sequence when the pixel generation path is travelling in a horizontal direction, either from left-to-right or from right-to-left;
the pixel generation path is a path through all pixels in the region;
the initial fill sequence of the region is a fill sequence at a beginning of the pixel generation path for the region; and
the fill sequence is composited to generate a color data for each pixel in the region.

13. A computer-readable storage medium having recorded thereon a representation of a page to be printed, said page comprising a plurality of graphic objects, wherein:
said representation comprises a plurality of regions, at least one of the plurality of regions comprising:
a plurality of crossing locations determined based on a single continuous pixel generation path, the plurality of crossing locations comprising a vertical crossing location and at least one other crossing location being a horizontal crossing location, each said crossing location activating a fill compositing sequence adapted to generate a colour of one or more pixels; and
an initial fill compositing sequence of the single continuous pixel generation path at a start of the region.

14. A computer readable storage device having recorded thereon a computer program executable by computerised apparatus for rasterizing at least a portion of a page comprising a plurality of graphic objects, said computer program comprising:
code for determining a single continuous pixel generation path for the portion of the page;
code for determining a plurality of crossing locations based on the single continuous pixel generation path, the plurality of crossing locations comprising at least a vertical crossing location and a horizontal crossing location;
code for determining an initial fill sequence of the single continuous pixel generation path at a predetermined location; and
code for rasterizing the portion of the page according to the initial fill sequence and at least a subsequent fill sequence upon encountering each of said determined crossing locations along the single continuous pixel generation path.

15. Apparatus for rasterizing at least a portion of a page comprising a plurality of graphic objects, said apparatus comprising:
determining means for determining a single continuous pixel generation path for the portion of the page;
determining means for determining a plurality of crossing locations based on the single continuous pixel generation path, the plurality of crossing locations comprising at least a vertical crossing location and a horizontal crossing location;
determining means for determining an initial fill sequence of the single continuous pixel generation path at a predetermined location; and
rasterizing means for rasterizing the portion of the page according to the initial fill sequence and at least a subsequent fill sequence upon encountering each of said determined crossing locations along the single continuous pixel generation path.

* * * * *